US011615083B1

(12) United States Patent
Attaluri et al.

(10) Patent No.: US 11,615,083 B1
(45) Date of Patent: Mar. 28, 2023

(54) STORAGE LEVEL PARALLEL QUERY PROCESSING

(71) Applicant: Amazon Technologies, Inc., Seattle, WA (US)

(72) Inventors: Gopi Krishna Attaluri, Cupertino, CA (US); Dhruva Ranjan Chakrabarit, San Jose, CA (US); Volodymyr Verovkin, San Jose, CA (US); Kamal Kant Gupta, Sonqualmie, WA (US); Shriram Sridharan, Sunnyvale, CA (US); Aakash Shah, Santa Clara, CA (US); Aleksandr Valerevich Feinberg, Saratoga, CA (US); Yuri Volobuev, Walnut Creek, CA (US); Tengiz Kharatishvili, Sammamish, WA (US); Saileshwar Krishnamurthy, Palo Alto, CA (US); Anurag Windlass Gupta, Atherton, CA (US); Murali Brahmadesam, Woodinville, WA (US); Namrata Bapat, Sunnyvale, CA (US); Alexandre Olegovich Verbitski, Woodinville, WA (US); Jeffrey Davis, Santa Clara, CA (US); Debanjan Saha, Los Altos, WA (US)

(73) Assignee: Amazon Technologies, Inc., Seattle, WA (US)

(*) Notice: Subject to any disclaimer, the term of this patent is extended or adjusted under 35 U.S.C. 154(b) by 371 days.

(21) Appl. No.: 15/918,965

(22) Filed: Mar. 12, 2018

Related U.S. Application Data

(60) Provisional application No. 62/590,220, filed on Nov. 22, 2017.

(51) Int. Cl.
*G06F 16/2453* (2019.01)

(52) U.S. Cl.
CPC .. *G06F 16/24532* (2019.01); *G06F 16/24539* (2019.01); *G06F 16/24542* (2019.01)

(58) Field of Classification Search
CPC ......... G06F 16/24532; G06F 16/24539; G06F 16/24542
USPC ................................ 707/713, 718, 764, 769
See application file for complete search history.

(56) References Cited

U.S. PATENT DOCUMENTS

| | | |
|---|---|---|
| 5,511,190 A | 4/1996 | Sharma et al. |
| 7,657,516 B2 | 2/2010 | Zaman et al. |
| 8,150,889 B1 * | 4/2012 | Bacthavachalu ....... G06F 9/505 707/802 |

(Continued)

OTHER PUBLICATIONS

U.S. Appl. No. 15/841,110, filed Dec. 13, 2017, Gopi Kirshna Attaluir et al.

(Continued)

*Primary Examiner* — Phong H Nguyen
(74) *Attorney, Agent, or Firm* — S. Scott Foster; Kowert, Hood, Munyon, Rankin & Goetzel, P.C.

(57) ABSTRACT

Storage level query processing may be implemented for processing database queries. Nodes that can access a database may perform parallel processing for at least a portion of a database query. An indication may be received that specifies parallel processing for the database query. The nodes can then be caused to perform the portion of the query as part of providing a result in response to the database query instead of a node, such as a query engine node, that received the database query.

20 Claims, 12 Drawing Sheets

(56) References Cited

U.S. PATENT DOCUMENTS

| | | | | |
|---|---|---|---|---|
| 8,359,316 | B2* | 1/2013 | Franke | G06F 16/278 707/737 |
| 8,738,645 | B1* | 5/2014 | Bacthavachalu | G06F 9/505 707/769 |
| 8,825,678 | B2* | 9/2014 | Potapov | G06F 12/00 707/754 |
| 9,239,864 | B2* | 1/2016 | Krishnamurthy | G06F 16/24532 |
| 9,244,793 | B1* | 1/2016 | Brown | G06F 30/33 |
| 9,244,974 | B2 | 1/2016 | Muras et al. | |
| 10,621,156 | B1 | 4/2020 | Morkel et al. | |
| 10,885,031 | B2* | 1/2021 | Chen | G06F 16/2456 |
| 10,909,116 | B2 | 2/2021 | Chakra et al. | |
| 2003/0229639 | A1* | 12/2003 | Carlson | G06F 16/24549 |
| 2007/0130208 | A1* | 6/2007 | Bornhoevd | G06F 9/485 707/999.107 |
| 2009/0254916 | A1* | 10/2009 | Bose | G06F 9/5066 718/104 |
| 2011/0302164 | A1* | 12/2011 | Krishnamurthy | G06F 16/24568 707/E17.014 |
| 2013/0275452 | A1* | 10/2013 | Krishnamurthy | G06F 16/24532 707/764 |
| 2014/0114952 | A1* | 4/2014 | Robinson | G06F 16/24532 707/718 |
| 2014/0310232 | A1 | 10/2014 | Plattner et al. | |
| 2016/0063021 | A1 | 3/2016 | Morgan et al. | |
| 2016/0342653 | A1* | 11/2016 | Chen | G06F 16/24556 |
| 2017/0004173 | A1* | 1/2017 | Simitsis | G06F 16/2455 |
| 2017/0102866 | A1 | 4/2017 | Calvillo et al. | |
| 2017/0180567 | A1 | 6/2017 | Sharma et al. | |
| 2017/0199910 | A1 | 7/2017 | Konik et al. | |
| 2018/0032574 | A1* | 2/2018 | Vandenberg | G06F 16/248 |
| 2018/0046643 | A1 | 2/2018 | Brodt et al. | |
| 2019/0087461 | A1 | 3/2019 | Hu et al. | |
| 2019/0384759 | A1* | 12/2019 | Cappiello | G06F 16/245 |
| 2020/0201860 | A1 | 6/2020 | Vogelsgesang et al. | |
| 2020/0210398 | A1 | 7/2020 | Liu et al. | |
| 2020/0295757 | A1 | 9/2020 | Choi et al. | |
| 2020/0334254 | A1 | 10/2020 | Arye et al. | |

OTHER PUBLICATIONS

U.S. Appl. No. 15/389,318, filed Dec. 22, 2016, Ippokratis Pandis et al.

U.S. Appl. No. 15/382,326, filed Dec. 16, 2016, Ippokratis Pandis et al.

U.S. Appl. No. 16/457,122, filed Jun. 28, 2019, Sangyong Hwang et al.

Makreshanski, Darko, et al. "Batch DB: Efficient isolated execution of hybrid OL TP+ OLAP workloads for interactive applications." Proceedings of the 2017 ACM International Conference on Management of Data. 2017. (Year: 2017).

Ozcan, Fatma, et al., "Hybrid transactional/analytical processing: A survey." Proceedings of the 2017 ACM International Conference on Management of Data. 2017. (Year: 2017).

Thant, Phyo Thandar, et al, "Hybrid Query Processing System (HOPS) for Heterogeneous Database (Relational and NoSQL)." Proceeding of the International Conference on Computer Networks and Information Technology. 2014. (Year: 2014).

U.S. Appl. No. 16/457,154, filed Jun. 28, 2019, Sangyong Hwang et al.

U.S. Appl. No. 17/116,923, filed Dec. 9, 2020, Shriram Sridharan et al.

Kemper, Alfons, and Thomas Neumann. "HyPer: A hybrid OLTP&OLAP main memory database system based on Virtual memory snapshots." 2011 IEEE 27th International Conference on Data Engineering. IEEE, 2011. (Year: 2011).

\* cited by examiner

STORAGE LEVEL PARALLEL QUERY PROCESSING

RELATED APPLICATIONS

This application claims benefit of priority to U.S. Provisional Application Ser. No. 62/590,220, entitled "STORAGE LEVEL PARALLEL QUERY PROCESSING," filed Nov. 22, 2017, and which is incorporated herein by reference in its entirety.

BACKGROUND

Some databases, such as Online Transaction Processing (OLTP) databases, may bring data pages to a query engine and then perform various operations to process the data pages in order to service database queries. The data pages may be stored in a cache (e.g., a buffer pool) for the query engine in order to provide quick access. In such databases individual or small (e.g., single page read and single write) queries can be answered quickly and with minimal network traffic as pages may be often already stored in the cache.

For analytical queries (e.g., queries with "fat" workloads, such as large, grouped aggregate queries performed by Online Analytical Processing (OLAP) databases), caching pages at the query engine provides much less of a performance benefit. For example, a large query may fill up and thus "pollute" the cache with results only relevant to the one large query so that when another query is processed the cache holds no relevant data to that query. Therefore, databases that bring data pages to the query engine may suffer performance penalties when performing certain kinds of queries.

Figure 1:
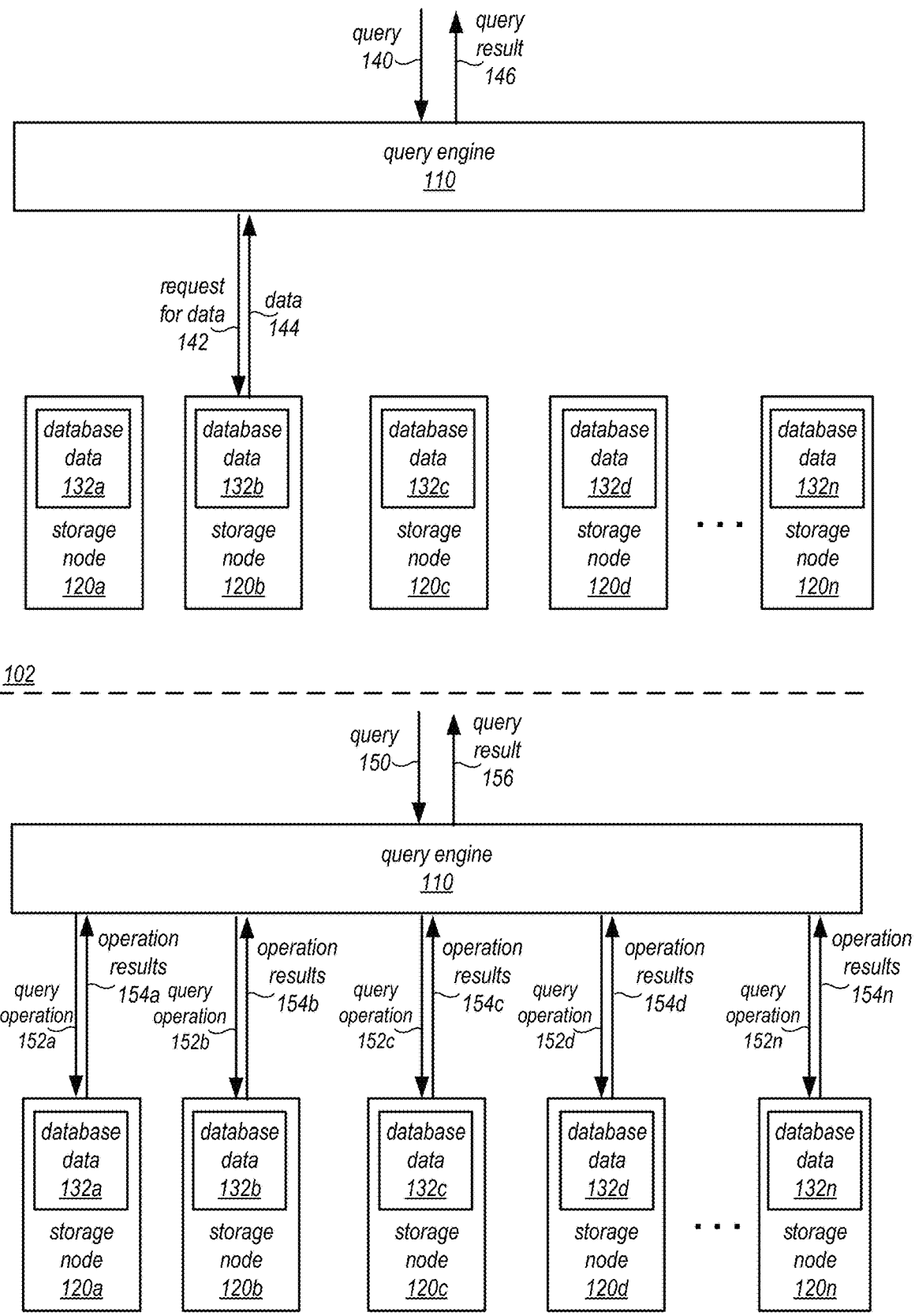
FIG. 1 is a logical block diagram illustrating storage level parallel query processing, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of storage level parallel query processing, are described herein. Some databases, such as OLTP-style databases (e.g., MySQL or PostgreSQL), may perform processing for database queries at the database or query engines by retrieving relevant data from storage and performing processing, in some embodiments. Such techniques can be very performant in scenarios where the results of multiple queries can be cached in a buffer pool for a database or query engine, in some embodiments, allowing individual queries to be answered quickly from the buffer pool and with minimal network traffic (often a single page read and a single write). For other queries that return large results that can operate on multiple pages at a time, caching results in a buffer pool may not provide similar benefits, in some embodiments. Storage level parallel query processing may offer flexibility to database or query engines to allow users and/or database or query engines to intelligently choose when to perform processing at a database or query engine or shift processing to storage for the database which may leverage parallel performance capabilities of a distributed storage system, in some embodiments. For example, OLTP style queries could be processed using a buffer pool, while OLAP style queries could be partially performed in storage, in parallel, in some embodiments. Moreover, storage level parallel query processing may allow for concurrent or overlapping performance of different types of queries without interference (e.g., long running OLAP queries that do not effect concurrently received OLTP queries) on the same query engine, in embodiments. In this way, the performance of database or query engines or other systems that perform database queries can improved (e.g., increased query speed, reduced network bandwidth, increased capacity to perform other types of queries, among other performance improvements) by leveraging parallel query processing for some queries in order to take advantage of the greater number of resources that perform parallel query processing, in some embodiments.

Shifting some query processing to storage, instead of at a query engine which would still have to access storage may be implemented in various ways. In some embodiments, tuple streams may be generated at storage nodes that are at least partial query results, bypassing the need to bring the data to the query engine (e.g., into a buffer pool), in embodiments. Moreover, storage level parallel query processing can utilize parallel computation across multiple storage nodes, reduce data size (e.g., reducing size by a factor of 10 on queries that touch 10 Gigabytes, or greater, of data) based on the query processing performed (e.g. filter, grouped aggregate), and thus reducing network traffic and avoiding buffer pool pollution at a query engine (which may be still used to process other queries and would be able to take advantage of the buffer pool to efficiently and quickly process other queries without having to obtain data from storage), and avoid using temporary storage (for result materialization) at the query engine for things like sorts, hash joins, and grouped aggregates, in some embodiments, (e.g., which may save memory to increase the capacity of a query engine to process other queries or allow a host system to perform other tasks). In some embodiments, query processing could be shifted to specialized compute nodes that are neither head nodes nor storage nodes. At least some such embodiments would improve the performance of the query engine by shifting the work to other resources and allow more control over the degree of parallelism and the resources available, for example.

FIG. 1 is a logical block diagram illustrating storage level parallel query processing, according to some embodiments. In scene 102, query engine 110 may access database data, such as database data 132a, 132b, 132c, 132d, and 132n, stored across multiple storage nodes, such as storage nodes 120a, 120b, 120c, 120d, and 120n. Query engine 110 may perform query processing that brings data from storage at one or more storage nodes to query engine 110 for processing (e.g., in order to take advantage of buffer pool or other caching optimizations). For example, a query 140 may be received that targets one or a small number of database table entries (e.g., tuples). Query engine 110 may invoke a storage engine or other storage interface to access the data, which may be stored at a single storage node, such as a data page stored as part of database 132b at storage node 120b. The request for data 142 may be issued to storage node 120b which may return the requested data 144. Query engine 110 may then process the data according to the query (e.g., identify a requested column value in an entry) and return a query result 146. Query engine 110 may retain the data 144 in a buffer pool so that if another query for the same data is received, no request need be made to storage node 120b.

As illustrated in scene 104, query engine 150 may receive another type of query, query 150. Unlike query 140, query 150 may be a query that accesses a lot of data in the database (e.g., across one or more multiple tables). In some embodiments, as discussed below with regard to FIG. 8, the query may specify or otherwise indicate that parallel query performance should be implemented in order to perform the query. In some embodiments, as discussed below with regard to FIG. 9, parallel query performance may be automatically selected for performing the query operation. Query engine 110 may cause the storage nodes 120 to perform a parallel query operation as part of performing query 150. For example, requests or instructions to perform one or more operations (e.g., scans, filters, aggregations, sortations, etc.), such as query operations 152a, 152b, 152c, 152d, and 152n, may be sent to storage nodes 120. Storage nodes 120 may perform the request query operations 152 with respect to the database data 132 that is indicated in the query operations. Instead of returning relevant data, storage nodes 120 may return operation results, such as operation results 154a, 154b, 154c, 154d, and 154n, which may be partially processed results and exclude data that would not satisfy query predicates, in some embodiments. Query engine 110 may perform further operations to combine the results (and apply undo processing as discussed below with regard to FIGS. 7 and 11 in some scenarios) in order to return a query result 150.

Please note, FIG. 1 is provided as a logical illustration of a query engine, storage nodes and respective interactions and is not intended to be limiting as to the physical arrangement, size, or number of components, modules, or devices to implement such features.

The specification first describes an example of a database system as a network-based database service that stores data for a database managed by the database service in a separate data storage service, according to various embodiments. Included in the description of the example network-based database service are various aspects of the example network-based database service along with the various interactions between the database service and the storage service, including interactions to perform storage level parallel query processing. The specification then describes a flowchart of various embodiments of methods for implementing storage level query processing. Next, the specification describes an example system that may implement the disclosed techniques. Various examples are provided throughout the specification.

The systems described herein may, in some embodiments, implement a web service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database or query engine to the storage layer and distributed across multiple nodes and storage devices. For example, in some embodiments, rather than the database or query engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process. In some embodiments, as discussed below with regard to FIGS. 6-11, query processing operations may be shifted to the storage layer in order take advantage of the performance gains that parallelism may achieve.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back, in some embodiments. To do this, the database may include several different components (or tiers), each of which performs a different function, in some embodiments. For example, a traditional database may be thought of as having three tiers: a first tier for performing query parsing, optimization and execution; a second tier for providing transactionality, recovery, and durability; and a third tier that provides storage, either on locally attached disks or on network-attached storage, in some embodiments.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In some embodiments, the database systems described herein may retain much of the structure of the upper half of the database instance (e.g., query processing and query optimization) but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations, in some embodiments.

In some embodiments, the database tier of a database instance may include a database engine head node server that receives read and/or write requests from various client programs (e.g., applications) and/or subscribers (users), then parses them and develops a plan to carry out the associated database operation(s). For example, the database engine head node may develop the series of steps necessary to obtain results for complex queries and joins. In some embodiments, the plan to carry out the read and/or write requests (e.g., in a database query) may include operations to perform some portion of the database query in parallel at multiple storage nodes, as discussed below with regard to FIG. 7. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group, in some embodiments. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum. Similarly, for a read request directed to a particular segment, the client-side driver may route the read request to all of the nodes on which the segment is stored (e.g., asynchronously and in parallel, at substantially the same time). As soon as the client-side driver receives the requested data from a read quorum of the storage nodes in the protection group, it may return the requested data to the database tier (e.g., to the database engine head node).

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged), in some embodiments. The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database or query engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained), in some embodiments. For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client-side driver may maintain metadata about the volume and may directly send asynchronous requests to each of the storage nodes necessary to fulfill read requests and write requests without requiring additional hops between storage nodes. For example, in some embodiments, in response to a request to make a change to a database, the client-side driver may determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

Figure 2:
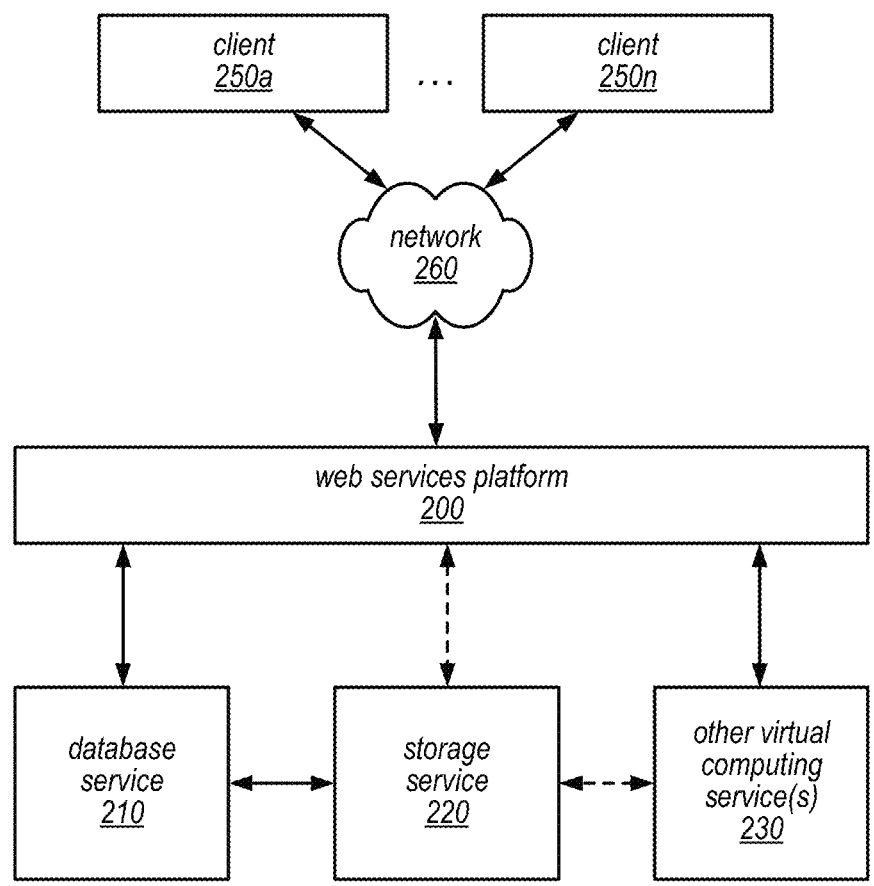
FIG. 2 is a block diagram illustrating a service system architecture that implement a database service that may implement storage level parallel query processing, according to some embodiments.

One embodiment of a service system architecture that may implement a web services-based database service is illustrated in FIG. 2. In the illustrated embodiment, a number of clients (shown as clients 250a-250n) may interact with a web services platform 200 via a network 260. Web services platform 200 may interface with one or more instances of a database service 210, a storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 2000 embodiment illustrated in FIG. 12 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit web services requests to web services platform 200 via network 260, including requests for database services (e.g., a request to generate a snapshot, etc.). For example, a given client 250 may include a suitable version of a web browser, or may include a plug-in module or other type of code module that may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing web services requests without necessarily implementing full browser support for all types of web-based data. That is, client 250 may be an application that may interact directly with web services platform 200. In some embodiments, client 250 may generate web services requests according to a Representational State Transfer (REST)-style web services architecture, a document- or message-based web services architecture, or another suitable web services architecture.

In some embodiments, a client 250 (e.g., a database service client) may provide access to web services-based storage of databases to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model of FIG. 1. Instead, the details of interfacing to Web services platform 200 may be coordinated by client 250 and the operating system or file system on behalf of applications executing within the operating system environment.

Clients 250 may convey web services requests (e.g., a snapshot request, parameters of a snapshot request, read request, restore a snapshot, etc.) to and receive responses from web services platform 200 via network 260. In various embodiments, network 260 may encompass any suitable combination of networking hardware and protocols necessary to establish web-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and web services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and web services platform 200. It is noted that in some embodiments, clients 250 may communicate with web services platform 200 using a private network rather than the public Internet. For example, clients 250 may be provisioned within the same enterprise as a database service system (e.g., a system that implements database service 210 and/or storage service 220). In such a case, clients 250 may communicate with platform 200 entirely through a private network 260 (e.g., a LAN or WAN that may use Internet-based communication protocols but which is not publicly accessible).

Generally speaking, web services platform 200 may implement one or more service endpoints that may receive and process web services requests, such as requests to access data pages (or records thereof). For example, web services platform 200 may include hardware and/or software that may implement a particular endpoint, such that an HTTP-based web services request directed to that endpoint is properly received and processed. In one embodiment, web services platform 200 may be implemented as a server system that may receive web services requests from clients 250 and to forward them to components of a system that implements database service 210, storage service 220 and/or another virtual computing service 230 for processing. In other embodiments, web services platform 200 may be implemented as a number of distinct systems (e.g., in a cluster topology) implementing load balancing and other request management features may dynamically manage large-scale web services request processing loads. In various embodiments, web services platform 200 may support REST-style or document-based (e.g., SOAP-based) types of web services requests.

In addition to functioning as an addressable endpoint for clients' web services requests, in some embodiments, web services platform 200 may implement various client management features. For example, platform 200 may coordinate the metering and accounting of client usage of web services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, platform 200 may also implement user authentication and access control procedures. For example, for a given web services request to access a particular database, platform 200 may ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding web services request, for example by returning a response to the requesting client 250 indicating an error condition. Various access control policies may be stored as records or lists of access control information by database service 210, storage service 220 and/or other virtual computing services 230.

It is noted that while web services platform 200 may represent the primary interface through which clients 250 may access the features of a database system that implements database service 210, it need not represent the sole interface to such features. For example, an alternate API that may be distinct from a web services interface may be used to allow clients internal to the enterprise providing the database system to bypass web services platform 200. Note that in many of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network, shown as the solid line between storage service 220 and database service 210 (e.g., through an API directly between the systems that implement these services). In such embodiments, the use of storage service 220 in storing databases on behalf of clients 250 may be transparent to those clients. In other embodiments, storage service 220 may be exposed to clients 250 through web services platform 200 to provide storage of databases or other information for applications other than those that rely on database service 210 for database management. This is illustrated in FIG. 2 by the dashed line between web services platform 200 and storage service 220. In such embodiments, clients of the storage service 220 may access storage service 220 via network 260 (e.g., over the Internet). In some embodiments, a virtual computing service 230 may receive storage services from storage service 220 (e.g., through an API directly between the virtual computing service 230 and storage service 220) to store objects used in performing computing services 230 on behalf of a client 250. This is illustrated in FIG. 2 by the dashed line between virtual computing service 230 and storage service 220. In some cases, the accounting and/or credentialing services of platform 200 may be unnecessary for internal clients such as administrative clients or between service components within the same enterprise.

Figure 3:
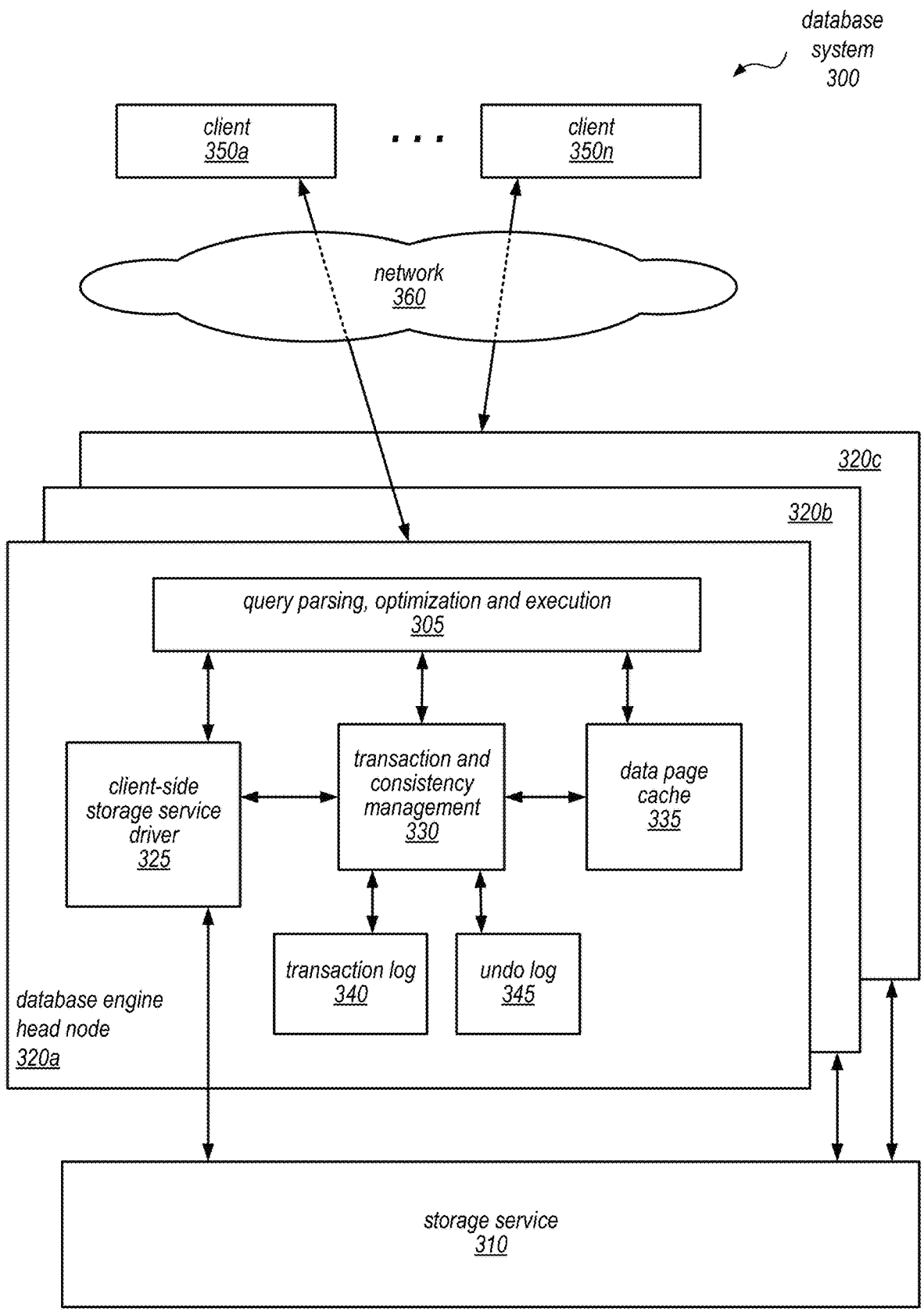
FIG. 3 is a block diagram illustrating various components of a database system that includes a database engine and a separate distributed database storage service, according to some embodiments.

FIG. 3 is a block diagram illustrating various components of a database system that includes a database engine and a separate distributed database storage service, according to one embodiment. In this example, database system 300 includes a respective database engine head node 320 for each of several databases and a storage service 310 (which may or may not be visible to the clients of the database system, shown as clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the clients 350a-350n). However, storage service 310, which may be employed by the database system to store data pages of one or more databases (and redo log records and/or other metadata associated therewith) on behalf of clients 350a-350n, and to perform other functions of the database system as described herein, may or may not be network-addressable and accessible to the clients 350a-350n, in different embodiments. For example, in some embodiments, storage service 310 may perform various storage, access, change logging, recovery, log record manipulation, and/or space management operations in a manner that is invisible to clients 350a-350n.

As previously noted, each database instance may include a single database engine head node 320 that receives requests (e.g., a snapshot request, etc.) from various client programs (e.g., applications) and/or subscribers (users), then parses them, optimizes them, and develops a plan to carry out the associated database operation(s), such as the plan discussed below with regard to FIG. 7. In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within storage service 310, receive write acknowledgements from storage service 310, receive requested data pages from storage service 310, and/or return data pages, error messages, or other responses to query parsing, optimization, and execution component 305 (which may, in turn, return them to database client 350a).

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance, such as applying undo log records to generate prior versions of tuples of a database from dirty tuples received from storage nodes, as discussed below. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the storage systems described herein may organize data in various logical volumes, segments, and pages for storage on one or more storage nodes. For example, in some embodiments, each database may be represented by a logical volume, and each logical volume may be segmented over a collection of storage nodes. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. As described in detail herein, the storage nodes may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of memory, generally of fixed size. In some embodiments, each page may be a block of memory (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, a log page may be a type of page that is used to store log records (e.g., redo log records or undo log records). In some embodiments, log pages may be identical in size to storage pages. Each log page may include a header containing metadata about that log page, e.g., metadata identifying the segment to which it belongs, in some embodiments. Note that a log page may be a unit of organization and may not necessarily be the unit of data included in write operations, in some embodiments. For example, in some embodiments, during normal forward processing, write operations may write to the tail of the log one sector at a time.

In some embodiments, log records (e.g., the individual elements of a log page) may be of several different classes. For example, user log records (ULRs), may be created and understood by users/clients/applications of the storage system, and may be used to indicate changes to user data in a volume, in some embodiments. Control log records (CLRs), may be generated by the storage system and may contain control information used to keep track of metadata such as the current unconditional volume durable LSN (VDL), in some embodiments. Null log records (NLRB) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page, in some embodiments. In some embodiments, log record types may be identified by GUIDs (rather than by integers or enums), which may simplify versioning and development, especially for ULRs.

In some embodiments, a payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size, in some embodiments. In addition, most log records may include additional parameters or data specific to that log record type, and this additional information may be considered the payload of that log record, in some embodiments. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages, in some embodiments.

Note that when storing log records in the log of a segment, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage, in some embodiments; otherwise the storage may be referred to as being out-of-band, in some embodiments. In some embodiments, the payloads of most large ULRs may be stored out-of-band.

In some embodiments, user pages may be the byte ranges (of a fixed size) and alignments thereof for a particular volume that are visible to users/clients of the storage system. User pages may be a logical concept, and the bytes in particular user pages may or not be stored in any storage page as-is, in some embodiments. The size of the user pages for a particular volume may be independent of the storage page size for that volume, in some embodiments. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware, in some embodiments.

In some embodiments, a storage node may be a single virtual machine that on which storage node server code is deployed. Each storage node may contain multiple locally attached storage devices, and may provide a network API for access to one or more segments, in some embodiments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

In various embodiments, storage devices may be a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. A storage device is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each storage device may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments, in some embodiments.

Figure 4:
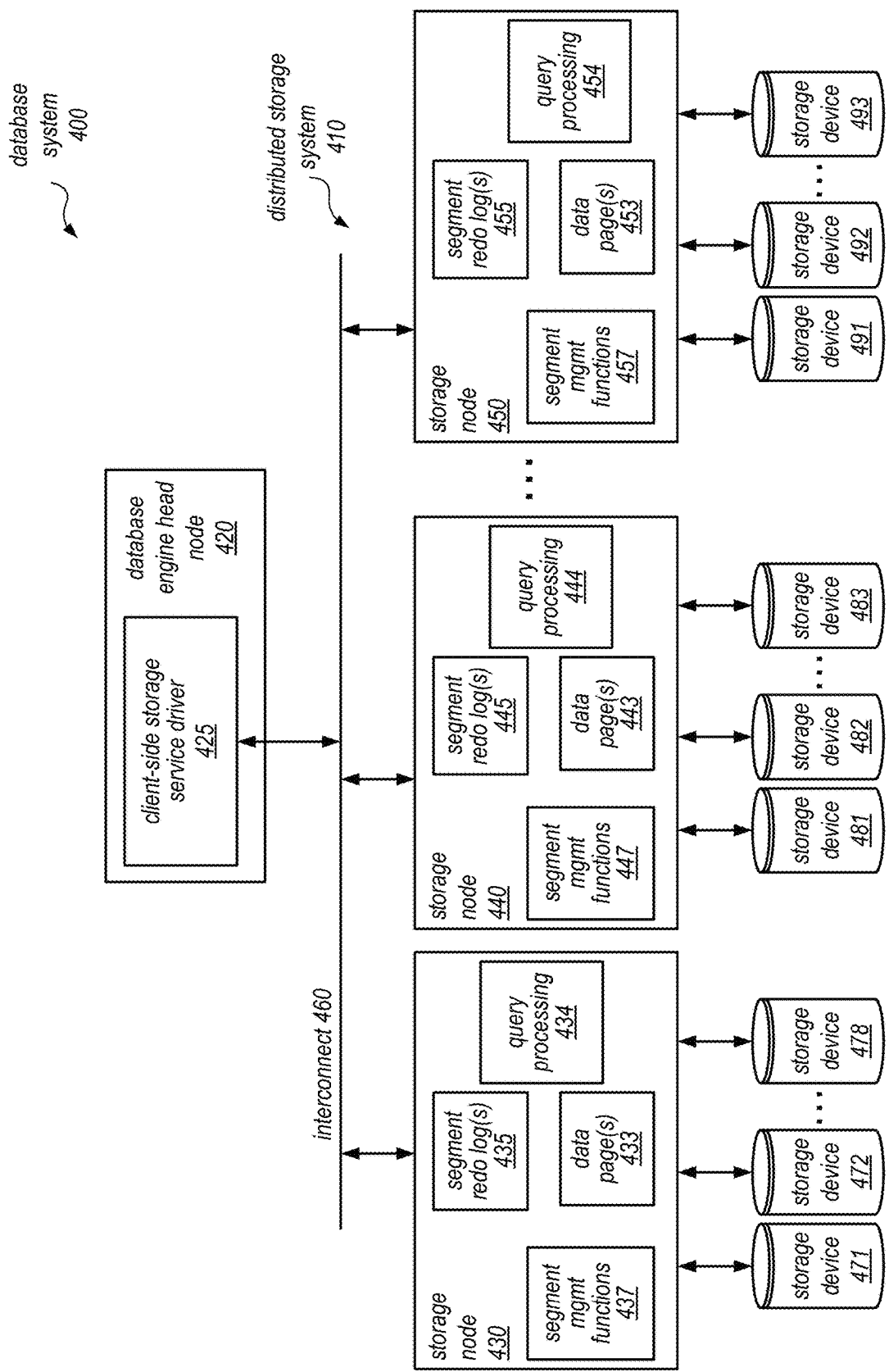
FIG. 4 is a block diagram illustrating a distributed storage system, according to some embodiments.

One embodiment of a distributed storage system that may implement a storage service (or other separate storage system for a database) is illustrated by the block diagram in FIG. 4. In this example, a database system 400 can access a distributed storage system 410, which communicates with a database engine head node 420 over interconnect 460. As in the example illustrated in FIG. 3, database engine head node 420 may include a client-side storage service driver 425. In this example, distributed storage system 410 includes multiple storage nodes (including those shown as 430, 440, and 450), each of which includes storage for data pages and redo logs for the segment(s) it stores, and hardware and/or software may implement to perform various segment management functions and query operations. For example, each storage node may include hardware and/or software may perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, query processing operations and/or space management (e.g., for a segment). Each storage node may also have multiple attached storage devices (e.g., SSDs) on which data blocks may be stored on behalf of clients (e.g., users, client applications, and/or database service subscribers), in some embodiments.

In at least some embodiments, storage nodes may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.). In some embodiments, user-influenced input (query, perhaps in some processed form) and data pages may shift query processing from a single-tenant environment (e.g., a database head node) to a multi-tenant environment (e.g., storage node). In order to provide additional security, the storage level parallel query processing (e.g., query processing 434, 444, and 454) may be done in a standalone process, with a software "jail" built around it, using a downgraded security context, seccomp, cgroups, and potentially other hostile code execution mitigation techniques, in embodiments. The attack surface may be minimized by using a minimal subset of query processing code, and performing the initial query parsing on the HN side, in some embodiments.

In some embodiments, query processing at storage nodes should not disrupt regular processing of access requests to read data pages or write redo log records (e.g., for OLTP style requests). In some embodiments, a process (e.g., a daemon) for query processing may have a hard limit of the memory and CPU footprint, to guard against resource drain, for example. In embodiments, query processing may be performed in a separate address space in order to provide failure isolation. In this way, a bug in storage level parallel query processing code would not impact regular segment management operations (e.g., storing redo log records, returning data pages, coalesce operations, etc.), in some embodiments. Such precautions may isolate memory leaks and runaway resource consumption in general.

Figure 6:
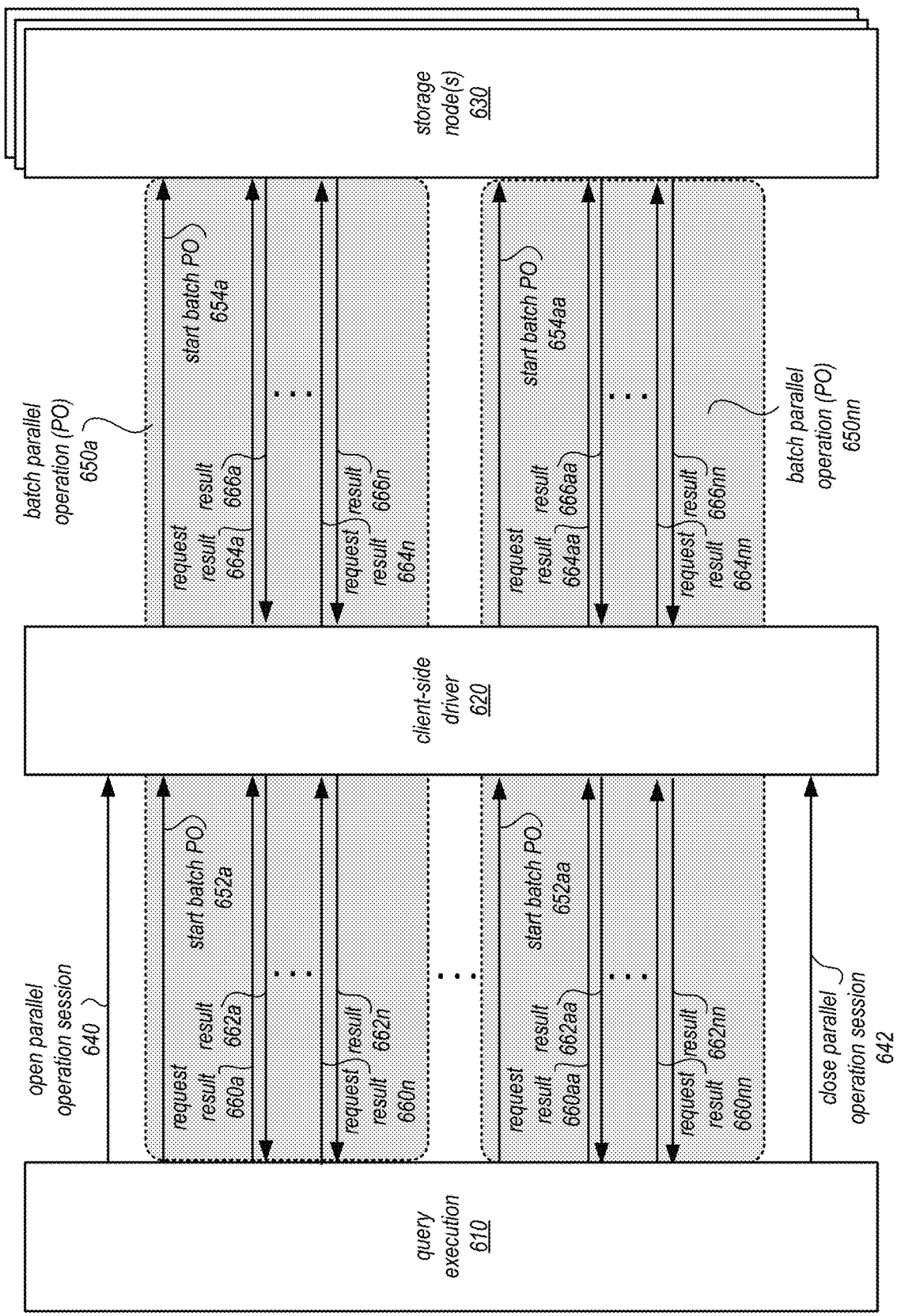
FIG. 6 is a block diagram illustrating interactions to direct performance of a parallel query operation at storage nodes in batches, according to some embodiments.

Query processing at storage nodes (e.g., query processing 434, 444, and 454) may be performed, as discussed below with regard to FIG. 11 and in response to various requests as discussed below with regard to FIG. 6, in some embodiments. For example, in some embodiments, query processing may only process tuples that are known to be safe to process on the storage nodes (e.g., visible to a database query), and send other tuples directly to the head node without processing.

In embodiments, query processing may be performed in a streaming fashion (e.g., for efficiency). In some embodiments, materialization of query processing results (e.g., in-memory or other storage) may facilitate blocking query operations, like hash partition, sort, and group aggregation (although group aggregation may decomposable so group aggregation operations may not necessarily materialize the entire result). In another example, if the head node is consuming query processing results slowly or unevenly, materialization can be a form of buffering. In yet another example embodiment, materialization on storage nodes can allow storage nodes to complete processing and release or advance garbage collection point in times sooner, without waiting for the head node to consume the entire result. In this way, garbage collection may not be delayed, in some embodiments. In some embodiments, materialization on a storage may coincide with embodiments that ensure cleanup. In embodiments, materialization on the storage node may be part of the existing volume. In other embodiments, materialization may coincide with creation of a new temporary space for storing query processing results.

In the example illustrated in FIG. 4, storage node 430 includes data page(s) 433, segment redo log(s) 435, segment management functions 437, query processing function 434, and attached storage devices 471-478. Similarly, storage node 440 includes data page(s) 443, segment redo log(s) 445, segment management functions 447, query processing function 444, and attached storage devices 481-488; and storage node 450 includes data page(s) 453, segment redo log(s) 455, segment management functions 457, query processing function 454, and attached storage devices 491-498.

In embodiments, query processing function(s) 434, 444, and 454 may perform the storage level parallel query processing, as discussed above and below. For instance, the query processing functions may perform computations at the storage nodes (e.g., in a distributed manner), instead of those computations being performed at the head node.

In some embodiments, each of the storage nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Figure 5:
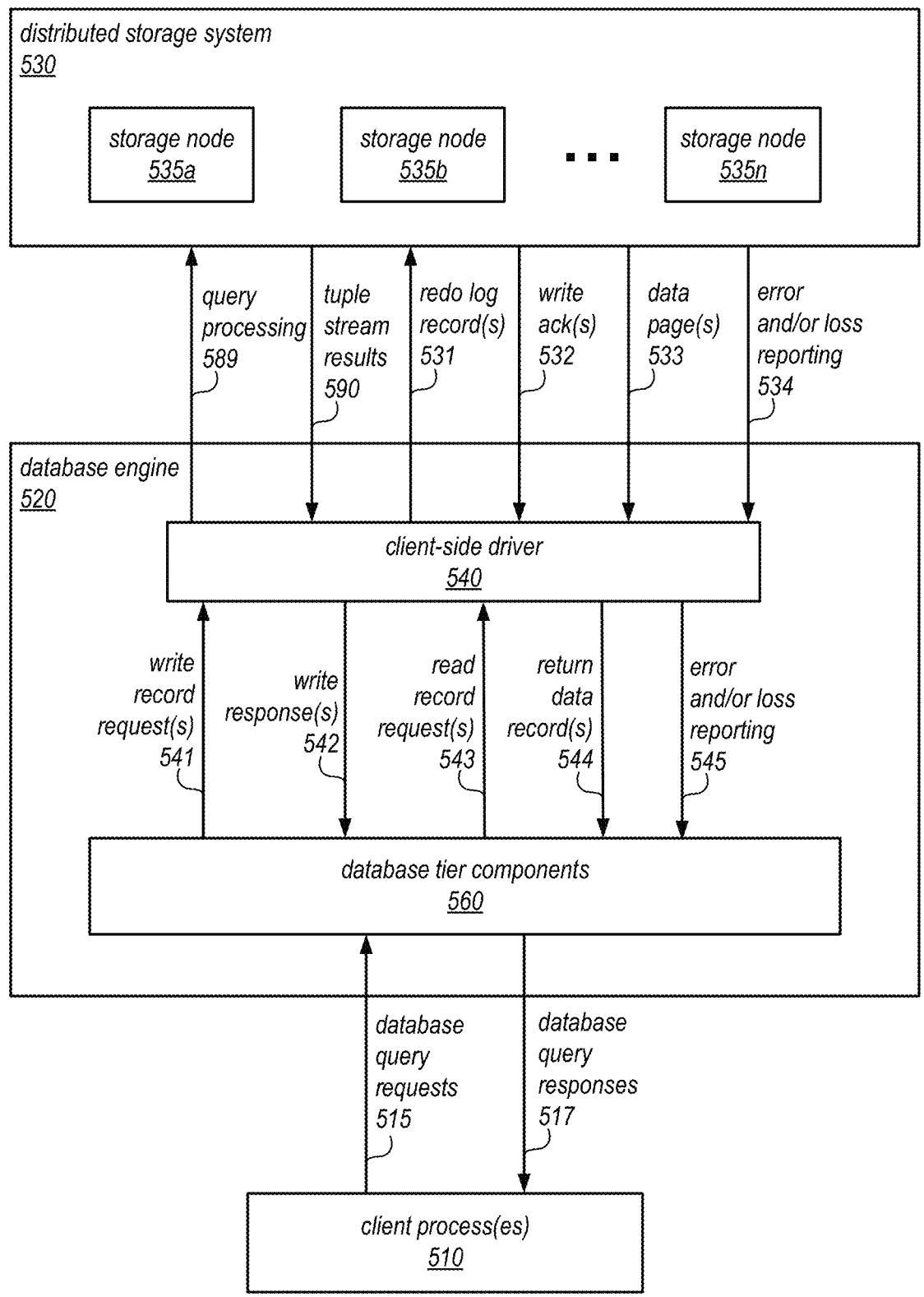
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of distributed storage system 530. Distributed storage system 530 may return a corresponding write acknowledgement 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535a-535n, each of which may have multiple attached SSDs. In some embodiments, distributed storage system 530 may provide high durability for stored data block through the application of various types of redundancy schemes.

Note that in various embodiments, the API calls and responses between database engine 520 and distributed storage system 530 (e.g., APIs 531-534) and/or the API calls and responses between client-side driver 540 and database tier components 560 (e.g., APIs 541-545) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine 520 and/or distributed storage system 530.

As noted above, in some embodiments, the functional components of a database system may be partitioned between those that are performed by the database engine and those that are performed in a separate, distributed, storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the storage service and to send it to the storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

FIG. 5 also illustrates that computations associated with query processing 589 may be sent to the storage nodes 535 for processing (e.g., the processing may be distributed across the storage nodes). As illustrated, results from the processing (e.g., in the form of tuple stream results 590) may be provided back the database engine, in embodiments.

In embodiments, storage level parallel query uses the existing client-side driver (CSD)/storage message passing framework, as noted above with respect to FIG. 5. In some embodiments, all communication may be initialized from the CSD side. In embodiments, communication may not be initialized from the storage node side. In some embodiments, CSD may use a "long poll" mechanism for creating a storage level parallel query session for each storage level parallel query, as discussed below with regard to FIG. 6. In embodiments, the same mechanism may be used for receiving periodic progress updates (e.g., heart-beats) from each worker while the query is being processed (not illustrated in FIG. 6). In some embodiments, a storage node may notify the head node when query processing (e.g., on a batch) has been completed, for example, providing a handle that the head node can use to pull the results from storage nodes. In some embodiments, the flow control may be implemented on the head node side. In some embodiments, the message format may implement a header containing control metadata, and data (rows/tuples) sent as raw data.

If a storage node fails (this may include less-than-complete failures, e.g. a process failure for query processing), the corresponding request (e.g., to process a batch of pages or tuples) may be resubmitted to another storage node that stores the data (e.g., a full segment from the same protection group (PG)). In another example, if a previous storage node fails while transmitting the query results back to the head node, the head node may keep the results already received, and only transfer the remainder from the new storage node, in some embodiments. In such embodiments, storage nodes may provide results in a deterministic order, in some embodiments. In some embodiments, it may be OK data may be processed in any order convenient and/or in parallel. In some embodiments, storage nodes may spill results to persistent storage if, for example, a memory buffer for results becomes full, while in other embodiments that cannot spill results to persistent storage processing may pause until further results can be fit in storage (or the process may be aborted).

In embodiments, the storage nodes may return tuple streams to the head node. Further interactions for performing some query operations in parallel at a storage nodes may be implemented, such as a hash partition operation. For example, the protocol and/or APIs may support a head node selecting a partition for a partition of a hash table and then retrieving a stream of tuples from that partition from a storage node. In some embodiments, the protocol and/or APIs associated with storage level parallel query may support aborting operation requests (e.g., cancelling streams from individual partitions without cancelling the whole operation). In some embodiments, metadata, such as the number of tuples in each partition is to facilitate the head node determining a join order (e.g., not creating a hash table of ten billion tuples in the head node if the other side is small).

Embodiments of storage level parallel query substantially expand the nature of requests that may be processed on the storage node, in some embodiments. In some embodiments parameters that may be variable-length and directly supplied by the user could be provided to a storage node as part of performing a parallel query operation. For instance, pushing down a filter like name='foo' may dictate sending the string "foo" down to the storage node for processing, where "foo" is a string supplied by the user. Furthermore, an expression may involve complex operators, such as a url like '%foo.com%', which may involve scanning a multibyte-encoded string. In some scenarios, the expression may be compound including multiple operators. The combination of user-supplied data, non-trivial operators, and compound expressions all executed on a multi-tenant system could pose security risks, in some embodiments. Such risks may include remote code execution on the storage node or compromising the data of other tenants on that node. One or multiple remedial solutions to mitigate risks may be implemented as part of performing parallel query operations at storage nodes, including, but not limited to: (a) process isolation, (e.g., at the request level with authentication credentials); (b) system features such as cgroups and NX pages; (c) language features; (d) battle-tested library functions with safe APIs; (e) static and dynamic analysis of storage node query processing performance; and/or (f) safer runtime features (e.g. special memory layouts, guard pages, undefined behavior traps, etc.).

In some embodiments, storage nodes may limit the resources consumed by individual requests and instances to avoid causing service degradation for other tenants on the storage node (in multi-tenant scenarios). In some embodiments, storage nodes may ensure that resources (such as temporary storage, volume LSN snapshots, etc.) are cleaned up in all cases when a query terminates (either successfully or due to cancellation or crash).

As discussed below with regard to FIG. 10, batch processing of pages (or other data) at storage nodes may offer several performance benefits. For example, garbage collection or other storage management techniques can make forward progress if query processing is performed in batches instead of once for an entire query. FIG. 6 is a block diagram illustrating interactions to direct performance of a parallel query operation in batches at storage nodes, according to some embodiments. Query execution 610, like database tier components 560 may perform functions such as those performed by query parsing, optimization and execution component 305 and transaction and consistency management component 330 of FIG. 3, in some embodiments. Client-side driver 620 (e.g. similar to client-side driver 540), may interact with storage nodes 630 to perform parallel operations for a database query, in some embodiments.

In some embodiments, query execution 610 may open a parallel operation session 640 with client-side driver 620. The parallel operation session may allow client side driver 620 to impose parallel processing limits (e.g., no more than 10 parallel operations sessions for a head node). Query execution 610 may select batches of pages, as discussed below with regard to FIG. 10, to perform a batch parallel operation associated with the batch, such as batch parallel operation 650a at storage nodes 630. Query execution 620 may send a request 652a to client-side driver 620 to start batch processing. Client-side driver 620 in turn may send a request to start batch processing 654a at storage nodes. The start requests 652a and 654a may include information to perform the parallel query operation, such as including information to perform the portion of the plan assigned to storage nodes as discussed below with regard to FIG. 7. For example, the start requests 652a and 654a may include a read LSN, a read view, a list of pages to scan, an op chain (to apply to clean tuples), a segment id, a schema, filters or other operations to apply to dirty tuples, among other information, in some embodiments. In some embodiments, a schema parser may be sent. Storage nodes 630 may store results in result buffers, which query execution 610 may request 660a from client-side driver 620 which may in turn request the results 664a. Storage nodes may provide the current results 666a in the clean and dirty buffers back to client-side driver 620 which may provide the results 662a back to query execution 610. Query execution 610 may poll for results for a batch over time, in some embodiments, as illustrated by result requests 660n and 664n and returned results 666n and 662n. Query execution may repeat the requests one or multiple times, in some embodiments for other batch parallel operations like batch parallel operation 650nn (which includes requests to start 652aa, requests for results 660aa, 664aa, 660nn, and 664nn, and results 662aa, 666aa, 662nn, and 666nn). When performance of the parallel query operation is completed, then query execution 610 may close parallel operation session 642 with client-side driver, in some embodiments.

Query planning (e.g., performed by a database engine head node) may apply various techniques to determine whether a parallel query operation should be included or otherwise selected to perform as part of performing a database query, in some embodiments. For example, as discussed below with regard to FIG. 8, a parallel processing may be specified for a database query in an indication, or may be determined automatically based on one or more criteria, as discussed below with regard to FIG. 9, in some embodiments. FIG. 7 is a block diagram illustrating an example query plan for performing storage level parallel query processing, according to some embodiments.

Query planning that includes the possibility of performing a parallel query operation may perform various query planning techniques including a cost forecast or estimation for different query plans (or portions thereof) to perform a database query, selecting the lowest cost query plan, in some embodiments. A cost estimate or value may be determined for parallel query operations as part of generating a query plan that includes a parallel query operation, in one embodiment. For example, a table size (e.g., in physical storage, bytes, or logical size, number of records) may be multiplied by a parallel query operation cost multiplier, in some embodiments, to determine a parallel query operation cost estimate.

In addition to determining whether to include a parallel query operation in the query plan to perform a database query, query planning may also include determining how the parallel query operation is to be performed, including what operations may be performed as part of the parallel query operation at the storage nodes (and correspondingly what operations may remain in the head node for performance. As illustrated in FIG. 7, a query plan that includes a parallel query operation may be divided in to head node processing 710 and storage nodes processing 730 portions. The query plan may further indicate different plan portions for different types of data (e.g., tuples) to be returned from parallel query operations. For example, the plan may include an operation for performing a remote scan operation for clean tuples 721 (which may be visible to the database query as stored at the storage nodes), in some embodiments. Similarly, a separate operation for performing a remote scan operation for dirty tuples 719 may be included. In some embodiments, other query plan selection techniques may be implemented. For example, plan generation rules or criteria may be applied to select between scenarios when storage node processing versus head node processing is performed (e.g., when a join is specified in the query storage node processing is automatically selected), in some embodiments.

The sub-plan or portion that describes the performance of parallel processing at storage nodes may include one or more other operations. For example, storage nodes processing 730 may include a data scan operation 735 to scan identified storage locations (e.g., the pages discussed above with regard to FIG. 6 and below with regard to FIGS. 10 and 11). For clean tuples, partial operation(s) 733 may be performed or applied to filter, exclude, or otherwise preprocess the clean tuples to provide query results, in some embodiments. These clean tuples may then be sent on, as indicated by operation 731 back to the head node, in some embodiments. For dirty tuples identified as part of scan 735, the dirty tuples may be sent on, as indicated by operation 739 (though some filtering or processing operations may still be performed at the storage nodes as discussed below with regard to FIG. 11). Once received, further processing may be performed on the dirty tuples, such as a resolve undo operation 717, which may determine whether or not undo records need to be applied to tuples in order to generate a version of the dirty tuples that is visible to the database query, in some embodiments. Partial operation(s) 715 may also be applied, similar to those partial operations 733 applied to the clean tuples at storage nodes. Combine operation 713 may describe how to combine the clean tuples with the processed dirty tuples at a head node before finalizing the query results at operation 711 to return to a client that requested the database query, in some embodiments, (e.g., finalizing results from a single partition or segment of a database together.

Figure 7:
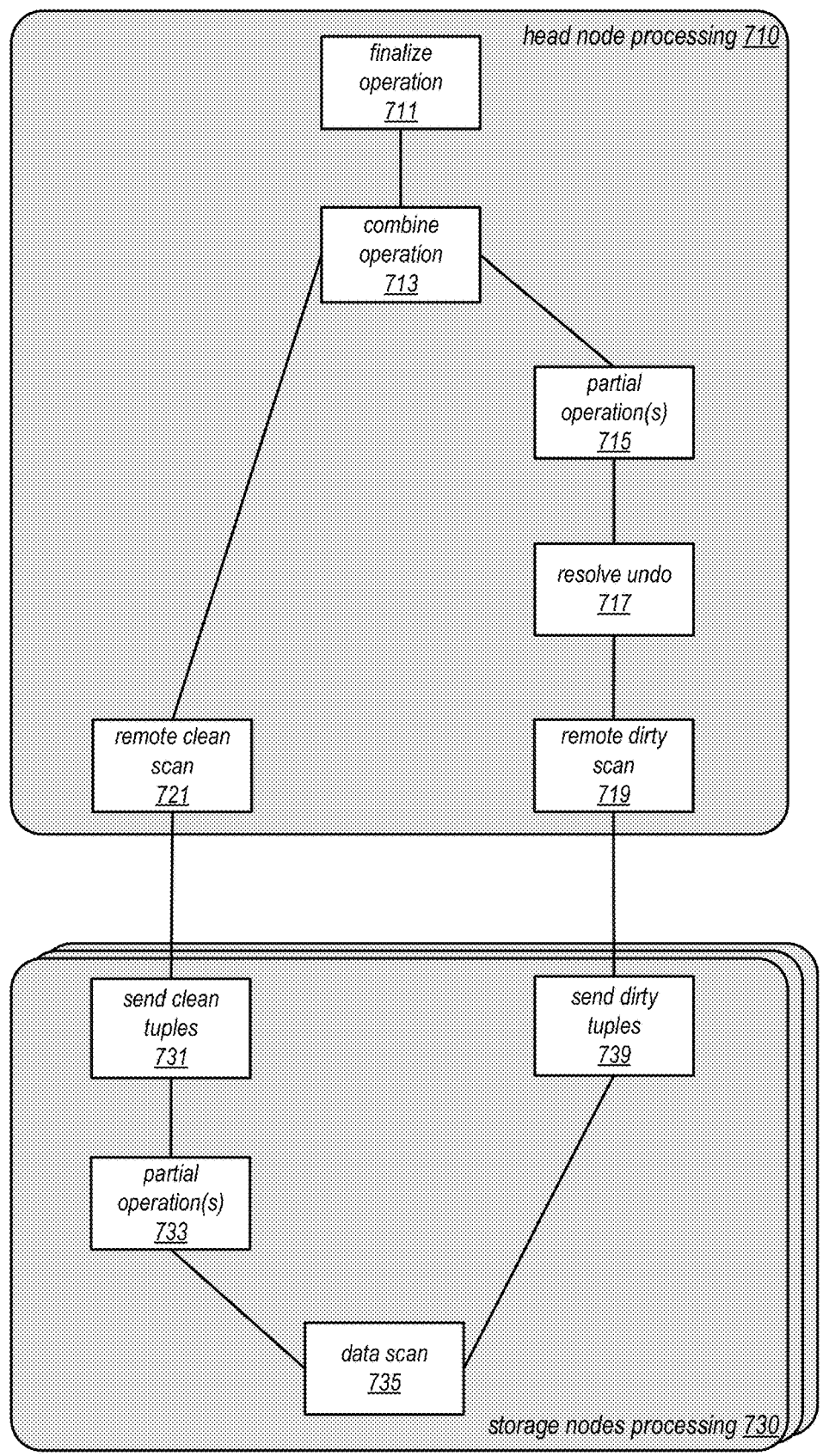
FIG. 7 is a block diagram illustrating an example query plan for performing storage level parallel query processing, according to some embodiments.

The framework illustrated in FIG. 7 may allow for many different scenarios or types of processing to be shifted from a head node to storage nodes, in some embodiments. For example, a query statement "SELECT w+1, X FROM foo WHERE y % 2=0" may require projecting w, x, and y but not z, which could be obtained from a read set. The predicate in the SQL statement may be translated into conjunctive normal form (CNF), in some embodiments. For each conjunct a determination could be made as to whether the conjunct is: (i) a simple filter, which can be pushed down to storage nodes and used on tuples in storage format (e.g., InnoDB format), (ii) a more general expression which can be pushed down to the storage nodes and used on a database engine format tuple (e.g., a tuple in MySQL format), or (iii) an expression which cannot be handled on storage nodes, and which instead should be processed on the head node, in some embodiments.

In some embodiments, the plan does not include operations that would shuffle tuples or results between storage nodes. In some embodiments, no parallel processing need be performed at the head node. In some embodiments, no undo processing may be performed on the storage nodes. In some embodiments, all operators, except HashPartition, may preserve input partitioning. HashPartition operations may repartitions all partitioned inputs and creates a new set of output partitions, in some embodiments. In some embodiments, filter and/or projection operations may preserve input ordering, while in some embodiments sort operations may re-order input. Some operators may replace or modify the input ordering, in some embodiments.

Figure 8:
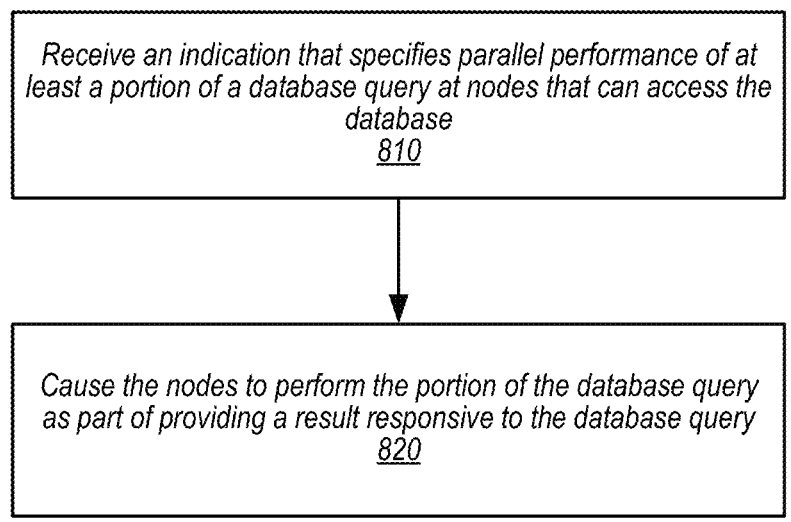
FIG. 8 is a high-level flow chart illustrating methods and techniques for receiving an indication that specifies parallel performance for a database query at nodes storing the database, according to some embodiments.

The database service and storage service discussed in FIGS. 2 through 7 provide examples of a system that may perform storage level parallel query processing. However, various other types of data stores (e.g., non-log structured) or other storage engines may implement on-demand data schema modifications for online reordering of database table columns. FIG. 8 is a high-level flow chart illustrating methods and techniques for receiving an indication that specifies parallel performance for a database query at nodes storing the database, according to some embodiments. Various different systems and devices may implement the various methods and techniques described below, either singly or working together. For example, a database engine head node or storage node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 810, an indication that specifies parallel performance of at least a portion of a database query at nodes that can access the database may be received, in some embodiments. The nodes may be storage nodes, in some embodiments, as discussed above with regard to FIGS. 2-7, or in other embodiments may be other nodes that host query processing components which can access data in a separate storage service (e.g., at other nodes that are storage nodes) to perform a portion of the database query. For example, a database query may include a flag, field, hint, or other indicator that identifies that a parallel query operation should be performed in order to process part of the database query, in some embodiments. The database query may be received via a programmatic interface (e.g., an API request to perform the database query), in some embodiments. The database query may be received via a connection that supports a protocol or language for the database query (e.g., Structured Query Language (SQL)) via a JDBC or ODBC driver. In some embodiments, parallel query processing may be specified according to a setting that may be turned on or off for a query engine (e.g., in response to an API request to modify the setting, an administrative console for the database, such as web-based GUI, etc.). Please note that in some embodiments parallel performance may be selected as part of query planning, as discussed below with regard to FIG. 9, and therefore the previous examples are not intended to be limiting as to other scenarios in which parallel performance at storage nodes may occur.

As indicated at 820, the nodes may be caused to perform the portion of the database query as part of providing a result responsive to the database query, in some embodiments. For example, as discussed above, instructions may be sent to the storage nodes identifying what portions of the database to access and process data in the database for the portion of the database query (e.g., scanning, predicate evaluation, aggregation or other data calculations, and/or filtering, among others).

Figure 9:
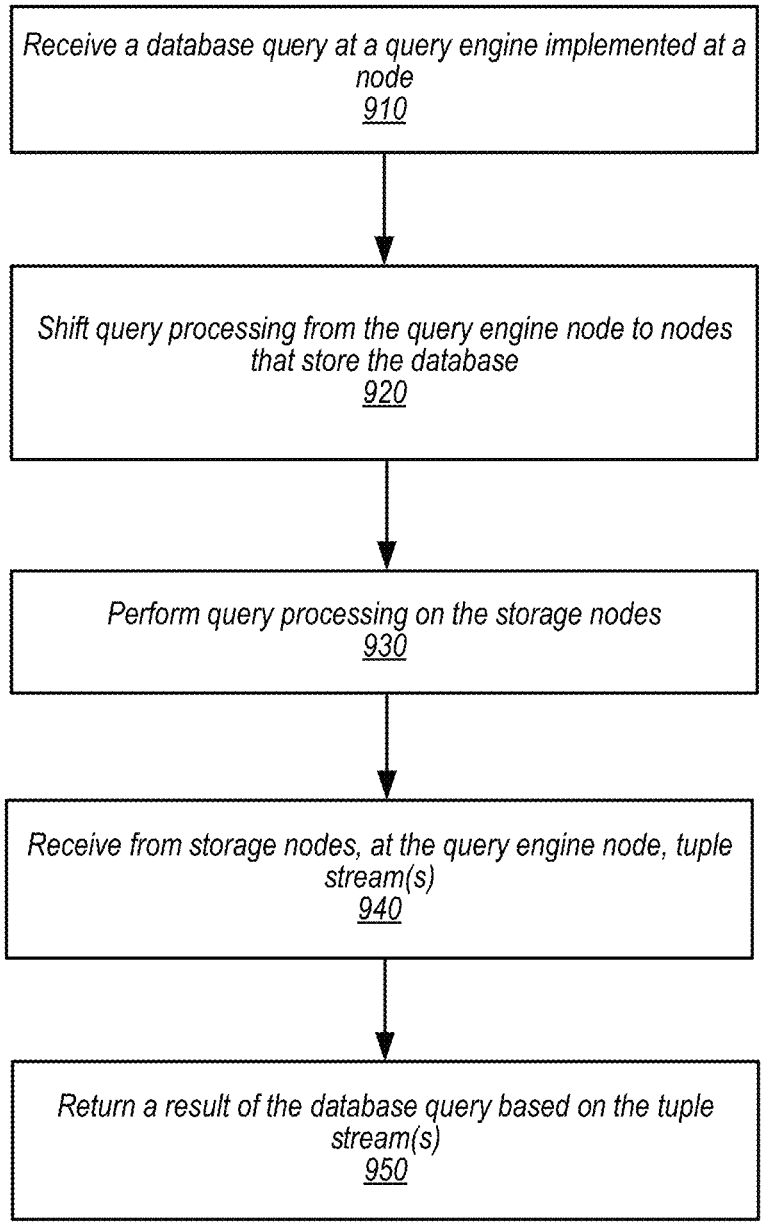
FIG. 9 is a high-level flow chart illustrating methods and techniques for performing a database query that includes performing storage level parallel query processing, according to some embodiments.

FIG. 9 is a high-level flow chart illustrating methods and techniques for performing a database query that includes performing storage level parallel query processing, according to some embodiments. As indicated at 910, a database query may be received at a database engine implemented at a node (e.g., a database engine head node as discussed above with regard to FIGS. 2-7). As discussed above with regard to FIG. 8, the database query may be received via a programmatic interface (e.g., an API request to perform the database query) and/or a connection that supports a protocol or language for the database query (e.g., Structured Query Language (SQL) statement) via a JDBC or ODBC driver, in some embodiments.

As indicated at 920, query processing may be shifted from the query engine node to nodes that store the database, in some embodiments. For example, as discussed above with regard to FIG. 8, the query processing may be shifted if an indication is received that specifies parallel query processing for the database query, query processing may be shifted. In some embodiments, query processing may be shifted automatically or in response to one or more criteria or determinations for the database query. For example, in embodiments, may be processed in parallel at storage nodes if: (a) there is at least one table in the query (i.e. not "SELECT 1"), (b) the table has not been modified (e.g., with a DDL statement), and/or (c) it is not a type of isolation level (e.g., serializable). In some embodiments, different groupings (e.g., just one of a-c, two of a-c, etc.) of the example criteria given above may be used to determine if a parallel query operation is performed at storage nodes instead of performing a query operation at the query engine (which would have to access data for the database via the storage nodes). In embodiments, query processing may not be shifted. For example, a determination of whether to use a parallel query operation may be based on (a) the size of the table (e.g., in bytes) (b) the size of the table in tuples (c) and/or whether storage level parallel query is being "forced" by an indication as discussed above. In embodiments, parallel query operations may be disabled. In some embodiments, parallel query operations may be disabled by a user or may be disabled by one or more criteria. For example, based on (a) how much memory the instance has or (b) how many parallel queries are currently running, in some embodiments.

To shift query processing to the storage nodes various instructions, requests, invocations, or other communications to perform query processing may be sent to storage nodes. Such communications may include, but are not limited to, a read view (e.g., indicated by a time stamp, such as an LSN), lists of portions of the database to process (e.g., segments, partitions, pages, blocks, and/or individual tuples), operations to perform (e.g., as an operation chain), and schema information for one or more database tables, in some embodiments. As indicated at 930, query processing may be performed on the storage nodes, in some embodiments. The storage nodes may be able to interpret the instructions, requests, invocations, or other communications in order to perform query processing (e.g., according to the techniques discussed below with regard to FIG. 11).

As indicated at 940, tuple stream(s) may be received from the storage nodes at the query engine node, in some embodiments. As discussed above with regard to FIG. 7, different operations may be performed on different types of tuple streams. Dirty tuples in a dirty tuple stream may be evaluated to determine whether undo log records should be applied to revert a tuple to a prior version that is consistent with the read view of a database query, in some embodiments. Note that even though a tuple is in the dirty stream, the tuple itself may not need to have undo applied, in some embodiments (as other tuples in a page may have been changed after the read view which would trigger identifying the page as dirty). Clean tuples in a clean tuple stream may already represent query results (although further modifications may occur if other operations for performing the database query are performed at the query engine node), in some embodiments.

As indicated at 950, a result of the database query may be returned based on the tuple streams, in some embodiments. For example, query results may be combined from the clean and dirty tuple streams and returned to a user that submitted the database query according to a same interface, in some embodiments.

As part of performing a database query, the pages, blocks, or other storage locations storing data for a database to evaluate for the database query may be identified, in some embodiments. For example, leaf pages of an index (e.g., a cluster index) may be scanned to determine the list of pages to scan to perform a database query. In embodiments, such a list may be computed on a database engine (e.g., a database engine head node), while in other embodiments, other components, such as a storage node, may compute some or all of the list of pages to scan. In at least some embodiments, (page, LSN) pairs may be used to perform a parallel query operation for a database query. These pairs may be collected by traversing the level one pages (e.g., pages that point to leaf pages) of a tree index structure (e.g., using lock crabbing), and recording the leaf pages that the level one pages point to, along with the level one page's LSN. In some embodiments, overlay information can be evaluated as part of identifying pages in a volume or protection group to collect.

Once identified, parallel query operations may be performed in order to perform at least a portion of a database query, in some embodiments. Parallel query operations may be performed upon data at the storage nodes in different ways. For example, a single instruction to scan the entire relevant data (e.g., all of the identified pages at each of the storage nodes) could be performed, in instance. In another embodiment, instructions to scan individual pages could be sent from a database engine (e.g., database engine head node) to the respective storage nodes. In order to ensure a consistent read view for a database query, however, the way in which parallel query operations are performed can have different implications. For example, since parallel query operations could be performed for large tables, the number of pages that needs to be scanned may be a large number too, in some embodiments. While in some embodiments, latches, locks or other concurrency controls may be implemented to lock access to parts or all of the database (e.g., locks on index pages, such as b-tree pages) to ensure a consistent read view, long running database queries could result in a lock being held a long time, blocking other queries to some or all of the database. Instead, pages can be identified, collected, and/or evaluated to perform the parallel query operation in batches so that concurrency controls on an index structure do not block access for the entire duration of the database query, in some embodiments.

Batching identification, collection, and/or evaluation of pages may also have performance benefits for garbage collection or other storage management operations in storage, at storage nodes. For example, in some database systems a storage space problem can occur when keeping data associated with older changes (e.g., older LSNs) in storage. A point in time can be determined which indicates when changes need no longer be preserved, in some embodiments. If a database system collected all of the (page, LSN) pairs at the beginning of the parallel query, and couldn't release the old page versions until the end, then a storage penalty could be incurred because the point in time could not be changed until after the query was over, extending the time in which log records would need to be preserved, in some embodiments. For example, in the systems described above with regard to FIGS. 2-7, a protection group (PG) for a portion of a database can allow log records in storage to be garbage collected up to a Protection Group Min Read Point LSN (PGMRPL)). For a long running query that utilized a parallel query operation, the PGMRPL could be held in position for the duration of a query if that query were not processed in batches (e.g., the PGMRPL could not advance which would allow clean up mechanism's to begin backing up and/or removing data that is older than the PGMRPL (e.g., older log records)). Batch processing of pages for performing a parallel query operation can spread the identification, collection, and/or processing of pages, in some embodiments. In the above example, the PGMRPL may only be constrained by the lowest LSN in the current batches being processed—not by some batch that has already processed, in one embodiment. In this way, the database system may be able to keep the PGMRPL moving forward, allowing storage space to be reclaimed.

Figure 10:
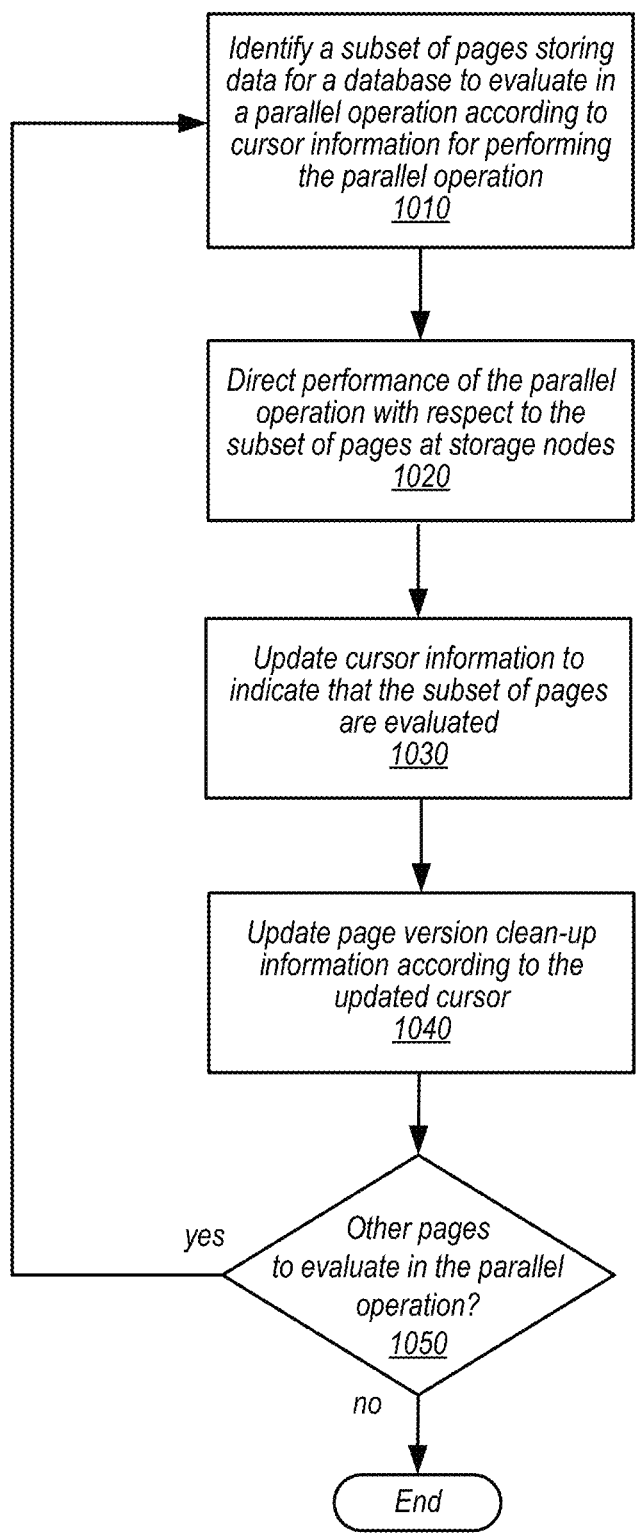
FIG. 10 is a high-level flow chart illustrating methods and techniques for batch processing of data pages for performing storage level parallel query processing, according to some embodiments.

FIG. 10 is a high-level flow chart illustrating methods and techniques for batch processing of data pages for performing storage level parallel query processing, according to some embodiments. As indicated at 1010, a subset of pages storing data for a database to evaluate in a parallel operation according to cursor information for performing the parallel operation may be identified, in some embodiments. In some embodiments, the identified list of pages to scan may be divided into batches, which may be the subset of pages storing data for a database to evaluate. For example, a batch may be large enough to allow amortizing the overhead of parallel query operation processing initiation and network communication, but small enough to allow storage nodes to hold the query results in memory, and not prevent a garbage collection or other storage management technique that can reduce the amount of changes stored in a storage node (e.g., holding a PGMRPL) for too long.

In some embodiments, cursor information may be maintained to identify, collect, and/or process pages. For example, a cursor can be on a previously recorded key value for a leaf page that was on the LO page. In some embodiments, a cursor may be opened at the level one page of that leaf page and continue with ordinary level one traversal to collect more (page, LSN) pairs. In some scenarios, the organization of pages can allow for various different techniques for implementing cursors. For example, in an embodiment that utilizes a b-tree to organize pages in storage, there could be considerable locality of the pages (e.g., where pages with related data are stored together). While a single cursor could be implement in such a scenario, multiple cursors could be opened at different points on the b-tree, which would increase the parallelism (e.g., it likely that multiple stripe-sets of data could be reached). In some embodiments, page distribution amongst storage nodes may be first analyzed and then a number and/or size of cursors can be determined. For example, each cursor may cover a part of a level one page or each cursor may cover multiple level one pages.

In some such embodiments, may be further divided into mini-batches, using the replication group of storage nodes (e.g., a protection group (PG)) as the workspace partitioning unit. In some embodiments, one of the storage nodes in a replication group that stores a full segment or other portion of the database to be evaluated may act as a worker for processing a given mini-batch. In this way, further parallelization may be performed in order to further increase the performance gained by dividing the workload again amongst storage nodes, in some embodiments (e.g., adding to the optimization provided by performing a sub-portion of a query in parallel).

As indicated at 1020, performance of the parallel operation may be directed with respect to the subset of pages at the storage nodes, in some embodiments. For example, as discussed above with regard to FIGS. 1, 6, 8 and 9, a parallel query operation may be instructed to or otherwise caused to be performed at nodes that store part of the database. Various information to perform the parallel query operation, such as portions of a query plan, as discussed above with regard to FIG. 7, may be provided as part of directing performance. A list or indication of pages at the respective storage nodes may be provided to each storage node (e.g., storage node A may be instructed to scan pages 10,100 to 10,599, storage node B to scan pages 10,600 to 10,650, and storage node C to scan pages 10,700 to 10,185), in some embodiments. Schema information describing information about the table may be included, in some embodiments, such as how many columns, data types of columns, among other information. Operations to perform, such as the partial operation chain discussed above, may be included, in some embodiments. A read view or other indication of what pages are visible to the database query as of a point in time for the database may be included, in some embodiments. Storage information (e.g., segment or partition identifier) may be included, in some embodiments.

After completion of performance of the parallel operation, cursor information may be updated to indicate that the subset of pages are evaluated, as indicated at 1030. For example, a last leaf page processed or included in a batch may be recorded, in some embodiments as part of cursor information. For those situations with multiple cursors, then the multiple cursor information may be respectively updated, in some embodiments, according to the different respective places at which prior batches have completed.

As indicated at 1040, in some embodiments, page version clean-up information may be updated according to the updated cursor. For example, the PGMRPL in the example given above may be advanced beyond the lowest LSN included in the batch. If other pages remain to be evaluated for the parallel operation then as indicated by the positive exit form 1050, pages for a new batch may be identified, in some embodiments. If not, then the parallel query operation may be complete for performing a database query, in some embodiments. Because the database may change while database query that includes a parallel query operation is performed (e.g., in response to other requests, such as "UPDATE" requests), completing one batch and starting the next batch may be carefully performed so that each tuple is evaluated (e.g., visible to the database query) once, in some embodiments.

As discussed above with regard to FIGS. 1, and 5-7, individual storage nodes or other components that have access to data stored for a database may perform at least some portion of processing for a database query. In this way, the work can be divided amongst many different storage nodes in order to leverage the processing capabilities of many storage nodes (e.g., instead of the processing capability of a single node, like the database engine head node). FIG. 11 is a high-level flow chart illustrating methods and techniques for performing processing of data pages at storage nodes as part of a parallel query operation, according to some embodiments.

In some embodiments, query performance at a storage node may operate upon or consider a batch of records, blocks, or data pages, as discussed above with regard to FIGS. 6 and 10. For example, as illustrated at 1110, a page of storage for a database may be identified to evaluate for a parallel operation, in one embodiment. The storage node may have received a list of pages from a database or query engine (e.g., a database engine head node as discussed above with regard to FIG. 6), in some embodiments, or in other embodiments, other indications of pages to scan may be derived from a cursor, marker, or other information that may be tracked or received. In some embodiments, pages may be identified according to their ordering in an indexing or storage structure for the database (e.g., according to an ordering of leaf nodes in a b-tree, such as from left to right).

Once a page is identified, the parallel operation may begin with respect to the page, in some embodiments. For example, individual records, rows, entries, or tuples within the page may be recognized. In some scenarios, data that is no longer visible to a database query (e.g., tuples that have been deleted in response to previous requests but not yet removed) may be excluded or otherwise skipped from evaluation. For instance, tombstone or other markers for individual entries in table may be stored within a row or as part of metadata for a row maintained in the identified page may indicate deleted tuples, allowing the tuples to be skipped for further processing.

As indicated at 1120, the tuple(s) in the identified page may be parsed according to a database schema for the database, in some embodiments. A database schema may include information such as the number of columns, data types of columns, width of columns, or other information which may be used to recognize and interpret values of individual columns (e.g., fields) within a tuple, in some embodiments. In this way, a logical evaluation of the tuples with respect to the parallel operation (e.g., including the various operations that may be applied to the tuples as determined from the database query as part of query planning) may be performed.

As indicated at 1130, a read view may be applied to identify which tuples are clean and which tuples are dirty, in some embodiments. A read view may be view or state of the database which may be exposed to a user for a database query, in some embodiments. The read view may, for instance, be associated with the state of the database at a particular point in time (e.g., logical time, such as a logical sequence number (LSN)). As noted above, the read view may be provided to a storage node from a database engine (e.g., a database engine head node) as an LSN or other time indication (e.g., a timestamp). The LSN may then be compared with LSN values associated with a page (or individual tuples). If the LSN of the read view is greater than the LSN values of the page or tuples (e.g., where a greater LSN value indicates a read view later in time), then it may be assumed that the tuples within the page have not been changed after the read view of the database query and thus the tuples may be visible (e.g., clean).

The operations that may be performed on tuples may be different depending on whether the tuples are clean or dirty, in some embodiments. For example, as illustrated in FIG. 11, for dirty tuples some filtering operations based on primary key values may be applied to the dirty tuple(s), in some embodiments. A primary key filter may, for instance, may be applicable in such scenarios because a database may, in some embodiments, not allow modifications to the primary key value of a tuple. Thus, value of the tuple's primary key may be visible to a database query whether or not other values in the tuple are visible (e.g., have been changed after the read view), in some embodiments. In this way, tuples that have primary key's that would not satisfy a predicate of the database query (e.g., a user identifier outside a user identifier range specified for the database query) may be filtered or otherwise excluded from a result sent back to the database engine, in some embodiments.

As indicated at 1150, the filtered dirty tuples may be stored in a dirty tuple result buffer, in some embodiments. For example, a dirty tuple result buffer may be maintained so that when a request for results is received from a database engine, the results for the dirty tuple result buffer may be provided as part of a the dirty tuple stream. In some embodiments, the dirty tuple result buffer may be used to boxcar or otherwise combine and send results (e.g., periodically or after reaching a certain number of results within the buffer). In at least some embodiments, the results may be stored in a storage format that may be understood by a storage engine or other component for the database engine (e.g., storing the results in Innodb format as opposed to a database engine format like MySQL).

Figure 11:
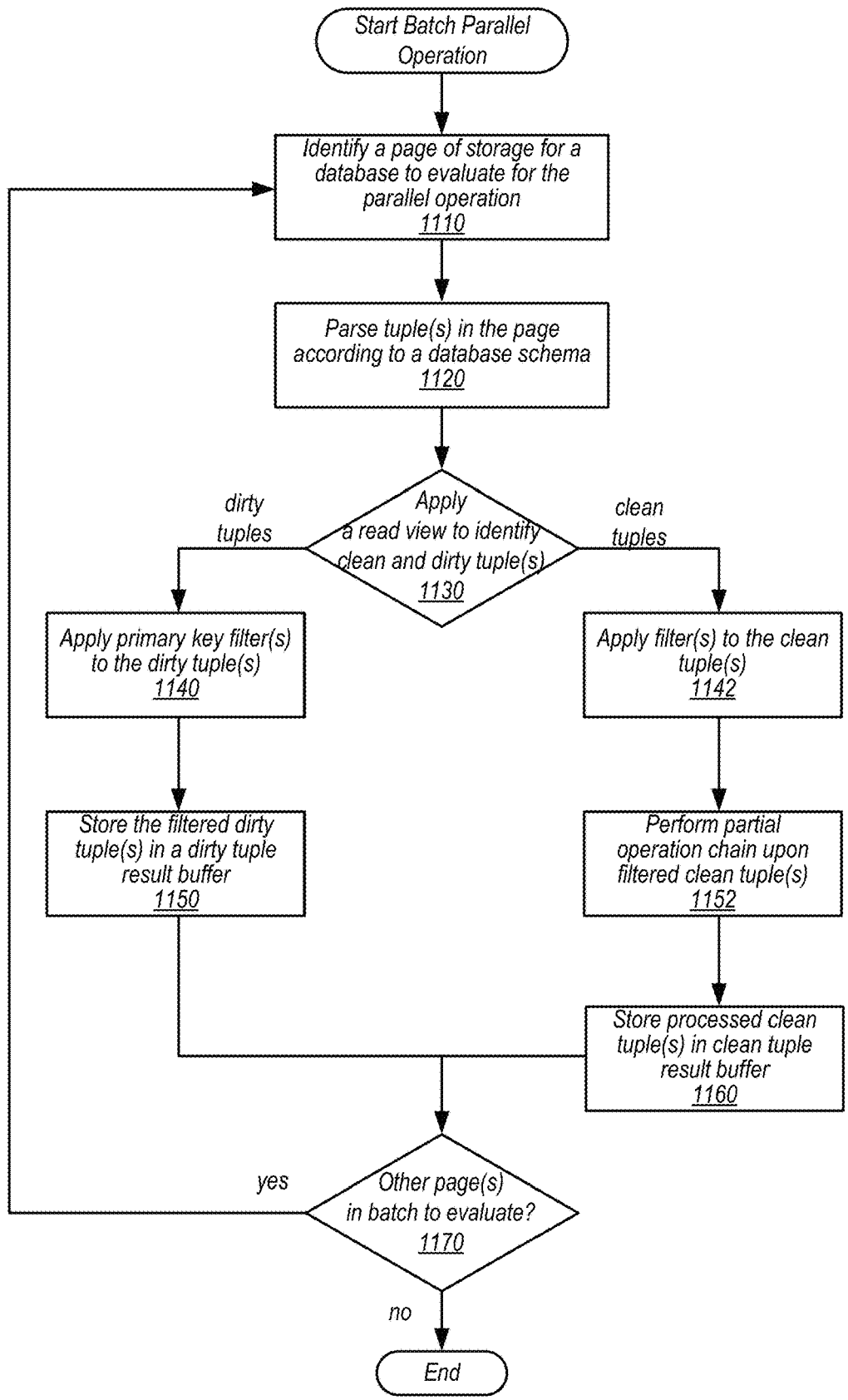
FIG. 11 is a high-level flow chart illustrating methods and techniques for performing processing of data pages at storage nodes as part of a parallel query operation, according to some embodiments.

As illustrated in FIG. 11, some different operations may be performed upon clean tuples, in some embodiments. For example, as indicated at 1142, one or multiple filters may be applied to the clean tuples, in some embodiments. The filters may include a primary key filter as discussed at 1140 and may also include other filters on other column values that are part of the tuple (e.g., filters on a "date" column), in some embodiments. For tuples that are stored according to a storage format that utilizes externally stored attributes (e.g., column values that may be stored in a separate location, such as variable length column values like strings), filtering may not be applied (or at least filtering that is not primary key filtering may not be applied), in some embodiments. The filtering at elements 1140 and 1442 may be specified according to a query plan, such as the example query plan discussed above with regard to FIG. 7.

As indicated at 1152, partial chain operations may be applied to filtered clean tuples, in some embodiments. For example, the tuples may be converted or otherwise transformed into a format that may be evaluated for performing the partial operation chain (e.g., to a database engine format, such as MySQL). As discussed above with regard to FIG. 7, various operations may be performed. For example, expressions included in a database query (e.g., predicate expressions that use comparison operations, "<" or ">" among others) may be used to evaluate column values in a tuple. In this way, tuples with column values that do not satisfy or otherwise pass the predicates can be skipped or otherwise excluded from the result tuples returned to the database engine. Thus, in some embodiments, expression evaluation may be performed to evaluate scalar/row functions for the purpose of predicate evaluation to reduce the amount of data sent to the database engine (e.g., the database engine head node). In embodiments, instructions to perform evaluation may be supported in bytecode provided to the storage node (or implemented thereon) to account for a large fraction of available database engine expressions (e.g., MySQL expressions).

As indicated at 1160, the processed clean tuple(s) may be stored in a clean tuple result buffer, in some embodiments. For example, a clean tuple result buffer may be maintained so that when a request for results is received from a database engine, the results for the clean tuple result buffer may be provided as part of a clean tuple stream. In some embodiments, the clean tuple result buffer may be used to boxcar or otherwise combine and send results (e.g., periodically or after reaching a certain number of results within the buffer). In some embodiments, the clean tuples may be stored in a database engine format (e.g., MySQL) as opposed to a storage engine format (e.g., InnoDB) like the dirty tuples in the dirty tuple result buffer, in some embodiments.

As indicated at 1170, the pages identified for a parallel operation may be iteratively processed, in some embodiments. If other pages in a batch remain to be processed, the technique may begin again at element 1110, in some embodiments. If no other pages in the batch remain to be processed, then the batch parallel operation may be complete, in some embodiments.

In some embodiments, metadata structures for performing a parallel operation at storage node may be created. These structures (such as "dict_table_t" "dict_index_t" and "row_prebuilt_t" in MySQL) may be created separate from the processing of an individual page, in some embodiments, because these metadata structures can be complex to construct. In some embodiments, an initialization, execution, and end phase may be implemented for performing a parallel operation so that multiple pages can be processed using the same metadata structures, so that the metadata structures are constructed only once.

Figure 12:
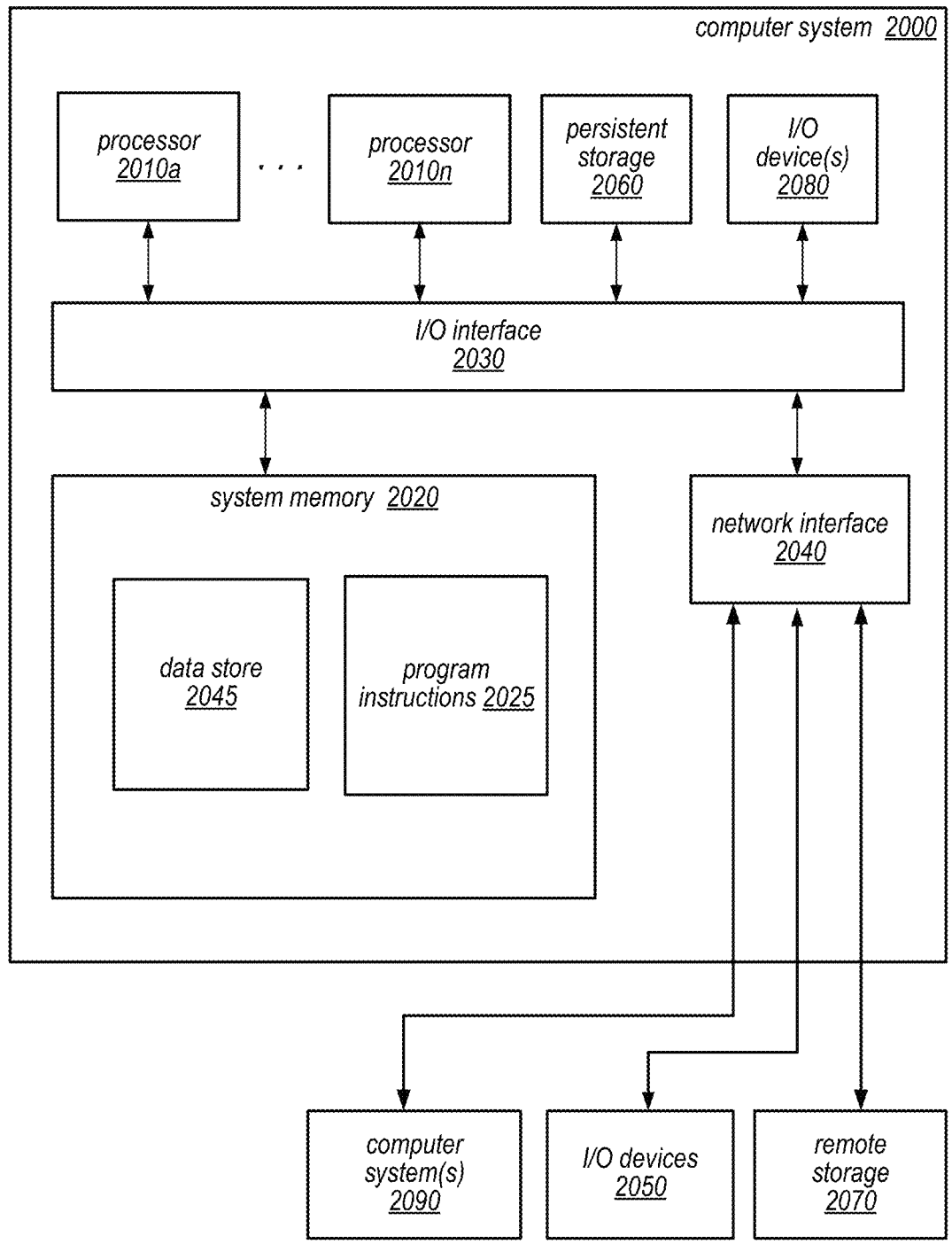
FIG. 12 is a block diagram illustrating a computer system that may implement at least a portion of systems described herein, according to some embodiments.

FIG. 12 is a block diagram illustrating a computer system that may implement at least a portion of the systems described herein, according to various embodiments. For example, computer system 2000 may implement a database engine head node of a database tier, or one of a plurality of storage nodes of a separate distributed storage system that stores databases and associated metadata on behalf of clients of the database tier, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 660, as desired, and may retrieve the stored instruction and/or data as needed. For example, in some embodiments, computer system 2000 may host a storage node, and persistent storage 2060 may include the SSDs attached to that server node.

Computer system 2000 includes one or more system memories 2020 that may store instructions and data accessible by processor(s) 2010. In various embodiments, system memories 2020 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be implemented as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 20 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor; and
   a memory to store program instructions that when executed by the at least one processor, cause the at least one processor to implement a query engine node, configured to:

receive a database query to a database;
   generate a plurality of query plans to perform the database query, wherein the plurality of query plans includes a particular query plan to perform the database query, wherein to generate the particular query plan, the query engine node is configured to determine how to divide processing of the database query into a parallel portion of the database query and a query engine node portion of the database query;
   wherein the particular query plan comprises operations to:
      assign the parallel portion of the database query to a plurality of storage nodes that are configured to perform the parallel portion of the database query, wherein performance of the parallel portion comprises processing, at respective ones of the storage nodes, different sub-portions of the parallel portion of the database query using different respective data of the database stored at respective ones of the plurality of storage nodes;
      receive, from the plurality of storage nodes, an operation result for the parallel portion of the database query, the operation result comprising output from the storage nodes resulting from processing the parallel portion of the database query; and
      access, by the query engine node, further data pages from one or more of the plurality of storage nodes to perform the query engine node portion of the database query to obtain an operation result for the query engine node portion of the database query;
   select, from among the plurality of query plans, the particular query plan to perform the database query, the selection based, at least in part, on a comparison of respective cost estimates of the particular query plan with respective cost estimates of one or more other query plans of the plurality of query plans generated to perform the database query; and
   cause the storage nodes to perform the parallel portion of the database query and to return the operation result for the parallel portion of the database query to the query engine node according to the particular query plan as part of performing the database query.

2. The system of claim 1,
   wherein to cause the storage nodes to perform the parallel portion of the database query, the program instructions cause the at least one processor to perform a method to send, by the query engine node, respective instructions to the storage nodes to perform at least a portion of the first query plan generated for the database query that includes the parallel portion of the database query;
   wherein the program instructions further cause the at least one processor to perform the method to:
   receive, at the query engine node, one or more dirty tuples of the database from one or more of the storage nodes;
   apply, by the query engine node, one or more undo log records to at least one of the one or more dirty tuples to generate a different version of the at least one dirty tuple;
   perform, by the query engine node, one or more operations included in the first query plan to process the different version of the at least one dirty tuple; and
   combine, by the query engine node, the processed at least one dirty tuple with one or more clean tuples received from one or more of the storage nodes as part of generating a result to the database query.

3. The system of claim 1, wherein the program instructions further cause the at least one processor to perform a method to:
  substantially concurrent with performance of the database query:
    receive, by the query engine node, a request to perform another database query;
    obtain, by the query engine node from at least one of the storage nodes, one or more data pages of the database to perform the other database query;
    perform, by the query engine node, the other database query with respect to the one or more data pages at the query engine node; and
    return, by the query engine node, a result to the other database query.

4. The system of claim 1, wherein the at least one processor is implemented as part of a network-based database service that hosts the database, wherein the storage nodes are implemented as part of a separate storage service, and wherein an indication that specifies performance of the parallel portion of the database query is received via an interface for the database service.

5. A method, comprising:
  receiving, at a query engine node, a database query;
  generating, by the query engine node, a plurality of query plans to perform the database query, wherein the plurality of query plans includes a particular query plan to perform the database query, wherein to generate the particular query plan, the query engine node is configured to determine how to divide processing of the database query into a parallel portion of the database query and a query engine node portion of the database query;
  wherein the particular query plan comprises operations to:
    assign the parallel portion of the database query to a plurality of storage nodes that are configured to perform the parallel portion of the database query, wherein performance of the parallel portion comprises processing, at respective ones of the storage nodes, different sub-portions of the parallel portion of the database query using different respective data of a database stored at respective ones of the plurality of storage nodes;
    receive, from the plurality of storage nodes, an operation result for the parallel portion of the database query, the operation result comprising output from a plurality of nodes resulting from processing the parallel portion of the database query; and
    access, by the query engine node, further data pages from one or more of the plurality of storage nodes to perform the query engine node portion of the database query to obtain an operation result for the query engine node portion of the database query;
  selecting, from among the plurality of query plans, the particular query plan to perform the database query, the selection based, at least in part, on a comparison of respective cost estimates of the particular query plan with respective cost estimates of one or more other query plans generated to perform the database query; and
  causing the plurality of nodes to perform the parallel portion of the database query and to return the operation result for the parallel portion of the database query to the query engine node according to the particular query plan as part of performing the database query.

6. The method of claim 5,
  wherein causing the plurality of nodes to perform the parallel portion of the database query to return the operation result for the parallel portion of the database query according to the first query plan of performing the database query comprises sending instructions to perform the parallel portion of the database query included in the first query plan.

7. The method of claim 5, wherein the method further comprises:
  receiving, at the query engine node, one or more clean tuples from at least one of the plurality of nodes; and
  including, by the query engine node, the one or more clean tuples in a result provided in response to the database query.

8. The method of claim 7, further comprising:
  receiving, at the query engine node, one or more dirty tuples from at least one of the plurality of nodes;
  applying, by the query engine node, one or more undo log records to the one or more dirty tuples to generate different respective versions of the one or more dirty tuples;
  performing, by the query engine node, one or more operations to process the different respective versions of the one or more dirty tuples; and
  including, by the query engine node, the processed one or more dirty tuples with the one or more clean tuples as part of the operation result to the database query.

9. The method of claim 8, further comprising applying a read view for the database query at the plurality of nodes to identify the one or more clean tuples and the one or more dirty tuples.

10. The method of claim 5, further comprising:
  receiving another database query;
  automatically selecting parallel performance of at least a portion of the other database query; and
  causing the plurality of nodes to perform the portion of the other database query as part of providing a result responsive to the other database query.

11. The method of claim 5, wherein causing the plurality of nodes to perform the parallel portion of the database query comprises:
  identifying respective subsets of database pages as one or more different batches; and
  directing performance of parallel operations with respect to the one or more different batches.

12. The method of claim 5, wherein causing the plurality of nodes to perform the parallel portion of the database query comprises causing the plurality of nodes to access the database via a plurality of storage nodes that store data for the database.

13. The method of claim 5, further comprising:
  substantially concurrent with performance of the database query:
    receiving a request to perform another database query at the query engine node;
    obtaining, by the query engine node from at least one of the plurality of nodes, one or more data pages of the database to perform the other database query;
    performing, by the query engine node, the other database query with respect to the one or more data pages at the query engine node; and
    returning, by the query engine node, a result to the other database query.

14. One or more non-transitory, computer-readable storage media, storing program instructions that when executed on or across one or more processors cause the one or more processors to implement:

receiving, at a query engine node, a database query;
generating, by the query engine node, a plurality of query plans to perform the database query, wherein the plurality of query plans includes a particular query plan to perform the database query, wherein to generate the particular query plan, the query engine node is configured to determine how to divide processing of the database query into a parallel portion of the database query and a query engine node portion of the database query;
wherein the particular query plan comprises operations to:
assign the parallel portion of the database query to a plurality of storage nodes that are configured to perform the parallel portion of the database query, wherein performance of the parallel portion comprises processing, at respective ones of the storage nodes, different sub-portions of the parallel portion of the database query using different respective data of a database stored at respective ones of the plurality of storage nodes;
receive, from the plurality of storage nodes, an operation result for the parallel portion of the database query, the operation result comprising output from a plurality of nodes resulting from processing the parallel portion of the database query; and
access, by the query engine node, further data pages from one or more of the plurality of storage nodes to perform the query engine node portion of the database query to obtain an operation result for the query engine node portion of the database query;
selecting, from among the plurality of query plans, the particular query plan to perform the database query, the selection based, at least in part, on a comparison of respective cost estimates of the particular query plan with respective cost estimates of one or more other query plans generated to perform the database query; and
causing the plurality of nodes to perform the parallel portion of the database query and to return the operation result for the parallel portion of the database query to the query engine node according to the particular query plan as part of performing the database query.

15. The one or more non-transitory, computer-readable storage media of claim 14, wherein the one or more non-transitory, computer-readable storage media store additional program instructions that further cause the one or more processors to implement:
substantially concurrent with performance of the database query:
receiving a request to perform another database query at the query engine node;
obtaining, by the query engine node from at least one of the plurality of nodes, one or more data pages of the database to perform the other database query;
performing, by the query engine node, the other database query with respect to the one or more data pages at the query engine node; and
returning, by the query engine node, a result to the other database query.

16. The one or more non-transitory, computer-readable storage media of claim 14, wherein the database query is received at a query engine node and wherein the one or more non-transitory, computer-readable storage media store additional program instructions that further cause the one or more processors to implement:
receiving, at the query engine node, one or more clean tuples from at least one of the plurality of nodes; and
including, by the query engine node, the one or more clean tuples in a result provided in response to the database query.

17. The one or more non-transitory, computer-readable storage media of claim 16, wherein the one or more non-transitory, computer-readable storage media store additional program instructions that further cause the one or more processors to implement:
receiving, at the query engine node, one or more dirty tuples from at least one of the plurality of nodes;
applying, by the query engine node, one or more undo log records to the one or more dirty tuples to generate a different respective versions of the one or more dirty tuples;
performing, by the query engine node, one or more operations to process the different respective versions of the one or more dirty tuples; and
including, by the query engine node, the processed one or more dirty tuples with the one or more clean tuples as part of the operation result to the database query.

18. The one or more non-transitory, computer-readable storage media of claim 14, wherein the one or more non-transitory, computer-readable storage media store additional program instructions that further cause the one or more processors to implement:
receiving another database query;
automatically selecting parallel performance of at least a portion of the other database query; and
causing the plurality of nodes to perform the portion of the other database query as part of providing a result responsive to the other database query.

19. The one or more non-transitory, computer-readable storage media of claim 14, wherein the one or more non-transitory, computer-readable storage media store additional program instructions that further cause the one or more processors to implement:
receiving an indication that specifies parallel performance of at least a portion of another database query at the plurality of nodes storing the database; and
rejecting the other database query responsive to a determination that a threshold number of queries utilizing parallel performance is exceeded.

20. The one or more non-transitory, computer-readable storage media of claim 14, wherein the one or more processors are implemented as part of a network-based database service that hosts the database, wherein the storage nodes are implemented as part of a separate storage service, and wherein the indication that specifies performance of the parallel query operation for the database query is received via an interface for the database service.

* * * * *